United States Patent
Isono et al.

(10) Patent No.: US 6,953,229 B2
(45) Date of Patent: Oct. 11, 2005

(54) HYDRAULIC BRAKING SYSTEM AND METHOD WITH FLOW CONTROL DEVICE

(75) Inventors: Hiroshi Isono, Toyota (JP); Takayuki Yamamoto, Aichi-ken (JP); Yasuji Mizutani, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 274 days.

(21) Appl. No.: 10/025,777

(22) Filed: Dec. 26, 2001

(65) Prior Publication Data

US 2002/0084691 A1 Jul. 4, 2002

(30) Foreign Application Priority Data

Dec. 28, 2000 (JP) ........................................ 2000-402218
Jan. 15, 2001 (JP) ........................................ 2001-006512

(51) Int. Cl.⁷ .............................................. B60T 8/44
(52) U.S. Cl. ................................ 303/114.1; 303/113.4
(58) Field of Search .......................... 303/113.1–116.2

(56) References Cited

U.S. PATENT DOCUMENTS

| | | | |
|---|---|---|---|
| 4,653,813 A | 3/1987 | Burgdorf | |
| 4,657,315 A | 4/1987 | Belart | |
| 4,708,404 A | 11/1987 | Seibert et al. | |
| 4,832,418 A | 5/1989 | Mattusch | |
| 4,838,619 A | 6/1989 | Ocvirk | |
| 4,852,952 A * | 8/1989 | Kervagoret | 303/116.2 |
| 4,869,560 A | 9/1989 | Nishii | |
| 5,031,968 A | 7/1991 | Takata | |
| 5,234,086 A | 8/1993 | Matsuda | |
| 5,249,853 A | 10/1993 | Reinartz | |
| 5,470,137 A | 11/1995 | Every et al. | |
| 5,496,099 A * | 3/1996 | Resch | 303/114.1 |
| 5,531,509 A | 7/1996 | Kellner et al. | |
| 5,707,115 A | 1/1998 | Bodie et al. | |
| 5,758,930 A * | 6/1998 | Schiel et al. | 303/113.4 |
| 5,826,953 A | 10/1998 | Heubner | |
| 5,882,093 A | 3/1999 | Enomoto | |
| 6,007,164 A | 12/1999 | Sakai et al. | |
| 6,053,582 A | 4/2000 | Ganzel | |
| 6,076,897 A | 6/2000 | Binder et al. | |
| 6,089,676 A | 7/2000 | Nishii et al. | |
| 6,126,248 A * | 10/2000 | Kawahata et al. | 303/114.1 |
| 6,186,602 B1 | 2/2001 | Jonner et al. | |
| 6,196,641 B1 | 3/2001 | Oka et al. | |
| 6,206,484 B1 | 3/2001 | Ganzel | |
| 6,231,134 B1 | 5/2001 | Fukasawa | |
| 6,315,370 B1 * | 11/2001 | Feigel et al. | 303/115.2 |
| 6,322,165 B1 * | 11/2001 | Klein et al. | 303/119.2 |
| 6,412,881 B1 * | 7/2002 | Isono et al. | 303/114.1 |
| 6,412,882 B1 * | 7/2002 | Isono et al. | 303/114.1 |

FOREIGN PATENT DOCUMENTS

| | | |
|---|---|---|
| DE | 198 33 084 | 7/1998 |
| DE | 197 16 404 | 10/1998 |
| DE | 199 17 810 | 11/1999 |
| DE | 199 50 029 | 4/2001 |
| JP | 2-169355 | 6/1990 |

(Continued)

*Primary Examiner*—Chris Schwartz
(74) *Attorney, Agent, or Firm*—Finnegan, Henderson, Farabow, Garrett & Dunner, LLP

(57) ABSTRACT

In an enabled mode of a first-fill device, if a fluid pressure in a first pressurizing chamber is lower than a predetermined value, a working fluid can be supplied to a brake cylinder from both the first pressurizing chamber and a second pressurizing chamber. If the fluid pressure in the first pressurizing chamber becomes higher than the predetermined value, the working fluid can be supplied only from the second pressurizing chamber. On the other hand, in a disabled mode of the first fill device, no matter how high the fluid pressure in the first pressurizing chamber is, the working fluid is supplied to the brake cylinder only from the second pressurizing chamber or supplied from both the first pressurizing chamber and the second pressurizing chamber.

7 Claims, 14 Drawing Sheets

FOREIGN PATENT DOCUMENTS

| | | |
|---|---|---|
| JP | 4-328064 | 11/1992 |
| JP | 7-40820 | 2/1995 |
| JP | 8-67242 | 3/1996 |
| JP | 11-59389 | 3/1997 |
| JP | 10-35466 | 2/1998 |
| JP | 10-86804 | 4/1998 |
| JP | 10-152041 | 6/1998 |
| JP | 2000-95094 | 4/2000 |
| JP | 2000-203413 | 7/2000 |
| JP | 2001-225739 | 8/2001 |
| WO | WO/98/47749 | 10/1998 |

* cited by examiner ical Patent Applications No. 2001-6512 filed Jan. 15, 2001 and No. 2000-402218 filed Dec. 28, 2000, the contents of which are incorporated hereinto by reference.

HYDRAULIC BRAKING SYSTEM AND METHOD WITH FLOW CONTROL DEVICE

This application is based on Japanese Patent Applications No. 2001-6512 filed Jan. 15, 2001 and No. 2000-402218 filed Dec. 28, 2000, the contents of which are incorporated hereinto by reference.

BACKGROUND OF THE INVENTION

1. Field of Invention

The present invention relates in general to a hydraulic braking system and method, and more particularly to a flow control for a hydraulic braking system and method.

2. Description of Related Art

One example of a known braking system of the type indicated above includes (a) a brake cylinder actuated by a pressurized fluid received from a fluid pressure cylinder, (b) a cylinder housing, (c) a pressurizing piston with a large radius portion and a small radius portion fluid-tightly and slidably received within the cylinder housing and cooperating with the cylinder housing to define a front pressurizing chamber and a rear pressurizing chamber, (d) a flow control device provided between the front pressurizing chamber and the rear pressurizing chamber and inhibiting a flow of the fluid from the front pressurizing chamber to the rear pressurizing chamber if a fluid pressure in the front pressurizing chamber is lower than a predetermined value and permitting the flow of the fluid from the front pressurizing chamber to the rear pressurizing chamber if fluid pressure in the front pressurizing chamber is higher than the predetermined value, and (e) a solenoid-operated shut-off valve provided in series with the flow control device and selecting a mode between a mode wherein the flow control device is disabled and a mode wherein the flow control device is enabled.

In this known braking system, if the flow control device is in the "enabled" mode, the flow from the front pressurizing chamber to the rear pressurizing chamber is not permitted while the fluid pressure in the front pressurizing chamber is lower than the predetermined value. If the fluid pressure in the front pressurizing chamber becomes higher than the predetermined value, the flow from the front pressurizing chamber to the rear pressurizing chamber is permitted. For this reason, if the fluid pressure in the front pressurizing chamber is lower than the predetermined value, a first-fill can be done rapidly, because more working fluid is supplied to the brake cylinder than if it is higher at the same stroke rate of the pressurizing piston. Also, in the "disabled" mode, the fluid in the front pressurizing chamber is supplied to the brake cylinder without being supplied to the rear pressurizing chamber.

On the other hand, another example of the known braking system of the type indicated above includes (a) a master cylinder pressurizing a fluid in accordance with an operation of a brake pedal, (b) a brake cylinder actuated by the pressurized fluid received from the master cylinder, (c) a master-cut valve disposed between the master cylinder and the brake cylinder, for selectively permitting and inhibiting a flow of the fluid between the master cylinder and the brake cylinder, and (d) a brake pressure control device provided between the master-cut valve and the brake cylinder, for controlling the fluid pressure in the brake cylinder based upon the operation of said brake pedal.

In this known braking system, if the braking system is in a normal state, the fluid pressure in the brake cylinder is controlled by the brake pressure control device, leaving the master-cut valve shut-off. On the other hand, if the braking system is in an unusual state, the master-cut valve is opened and the fluid pressure in the master cylinder is applied to the brake cylinder to work the brake.

However, if the operation of the brake pedal is unusual there is no way to control the fluid pressure in the brake cylinder by the brake pressure control device.

SUMMARY OF THE INVENTION

It is therefore a first object of this invention to provide a hydraulic braking system equipped with two chambers in front of a pressurizing piston from which a fluid pressure cylinder can supply a working fluid to a brake cylinder, wherein a first-fill can be done rapidly and a first-fill device can be both enabled and disabled.

A second object of this invention is to provide a hydraulic braking system controlling a fluid pressure in a brake cylinder by a pressure control device even if an operation of a brake operating member is unusual.

The first or second object indicated above may be achieved by any one of the following modes of the present invention, each of which is numbered like the appended claims and depends from the other mode or modes, where appropriate, so as to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessary provided all together, and that the invention may be embodied without some of the elements or features described with respect to the same mode.

(1) A hydraulic braking system includes a fluid pressure cylinder having a housing and including a pressurizing piston which is fluid-tightly and slidably received in the housing and which cooperates with the housing to define a front pressurizing chamber, a working fluid in the front pressurizing chamber being pressurized by an advance of the pressurizing piston; a brake including a brake cylinder which is connected to the front pressurizing chamber and which is activated by the working fluid pressurized in the front pressurizing chamber; a working fluid source connected to the fluid pressure cylinder; and a flow control device controlling a flow between the working fluid source and the fluid pressure cylinder based on a working state of the fluid pressure cylinder.

The flow control device can control the flow between the working fluid source and the fluid pressurizing cylinder. It makes more detail brake control possible. For example, if a hydraulic braking system includes a flow control device in the form of a first-fill selecting device as described in the following modes (2)–(17), a first-fill can be done rapidly and the first-fill device can be both enabled and disabled. On the other hand, if a hydraulic braking system includes a flow control device in the form of a flow inhibiting device as described in the following modes (18)–(32), the hydraulic braking system can control a fluid pressure in a brake cylinder by a brake pressure control device even if an operation of a brake operating member is unusual.

(2) A hydraulic braking system includes a fluid pressure cylinder having a housing and including a pressurizing piston with a large-radius portion and a small-radius portion which is fluid-tightly and slidably received in the housing and which cooperates with the housing to define a first pressurizing chamber and a second pressurizing chamber, a working fluid in the first and second pressurizing chamber being pressurized by an advance of the pressurizing piston; a brake including a brake cylinder which is connected to the fluid pressurizing cylinder and which is activated by the fluid pressurized in the fluid pressurizing cylinder; a working fluid source connected to the fluid pressure cylinder; a first-fill device provided between the working fluid source and the first pressurizing chamber, for inhibiting a flow of the fluid from the first pressurizing chamber to the working fluid source if a fluid pressure in the first pressurizing chamber is lower than a predetermined value and permitting the flow of the fluid from the first pressurizing chamber to the working fluid source if the fluid pressure in the first pressurizing chamber is higher than the predetermined value; and a first-fill selecting device for selecting a mode between a an enable mode of the first-fill device and a disabled mode of the first-fill device.

In the braking system of the present invention constructed as described above, the working fluid can be supplied to the brake cylinder from both the first pressurizing chamber and the second pressurizing chamber provided in front of the pressurizing piston. In the enabled mode of the first-fill device, if the fluid pressure in the first pressurizing chamber is lower than the predetermined value, the working fluid can be supplied to the brake cylinder from both the first pressurizing chamber and second pressurizing chamber. If the fluid pressure in the first pressurizing chamber becomes higher than the predetermined value, the working fluid can be supplied only from the second pressurizing chamber. For this reason, if the fluid pressure in the front pressurizing chamber is lower than the predetermined value, a first-fill can be done rapidly, because more working fluid is supplied to the brake cylinder than if it is higher at the same stroke rate of the pressurizing piston.

On the other hand, in the disabled mode of the first fill device, no matter how high the fluid pressure in the first pressurizing is, the working fluid is supplied to the brake cylinder only from the second pressurizing chamber or supplied from both the first pressurizing chamber and the second pressurizing chamber.

Thus, the mode of the first-fill device can be selected between the "enable" mode and "disable" mode by the first-fill selecting device. By this first-fill selecting device, for example, a relationship between an operating of the brake operating member by an operator and a change of the fluid pressure in the brake cylinder can be tuned up.

As the predetermined value, for example, a fluid pressure when the first-fill is almost completed or a little larger value than that pressure may be chosen.

The fluid pressure cylinder may be a master cylinder including a pressurizing piston operatively connected to the brake operating member, the pressurizing piston being moved by the brake operating member to pressurize a fluid in a front pressurizing chamber. However, it is not necessary to be a master cylinder and may be also any fluid pressure cylinder as long as it supplies a pressurized working fluid to the brake cylinder.

The working fluid source may be, for example, a reservoir storing a working fluid at approximately atmospheric pressure. However, it may be anything that stores the working fluid at some pressure other than atmospheric pressure, or anything that pressurizes the fluid based on an operation of the brake operating member, that is, a master cylinder.

(3) In a hydraulic braking system according to the above mode (2), in the disabled mode of the first-fill device, the first-fill selecting device permits a flow of the working fluid into and from the working fluid source even if the fluid pressure in the first pressurizing chamber is lower than the predetermined value.

In the disabled mode of the first-fill device, the working fluid in the first pressurizing chamber is discharged to the working fluid source. So the working fluid is supplied to the brake cylinder from the second pressurizing chamber not from the first pressurizing chamber. Therefore, in this mode, if an operating force rate of the brake operating member applied to the pressurizing piston is held constant, an increasing rate of fluid pressure in the brake cylinder can be larger than in the mode wherein a working fluid is supplied to the brake cylinder from both the first pressurizing chamber and second pressurizing chamber.

(4) In a hydraulic braking system according to the above mode (2) or (3), the first-fill selecting device includes a shut-off valve disposed in parallel with the first-fill device and produces the disabled mode of the first-fill device by opening the shut-off valve and the enabled state of the first-fill device by shutting the shut-off valve off.

In the hydraulic braking system according to the above mode (4), the shut-off valve is disposed in parallel with the first-fill device. In the open state of the shut-off valve, the working fluid in the first pressurizing chamber is discharged to the working fluid source mainly through the shut-off valve, thereafter the first-fill device is disabled. In the closed state of the shut-off valve, the working fluid in the first pressurizing chamber is discharged to the working fluid source through the first-fill device, thereafter the first-fill device is enabled.

(5) In a hydraulic braking system according to the above mode (2), in the disabled mode of the first-fill device, the first-fill selecting device inhibits a flow of the working fluid into and from the working fluid source even if the fluid pressure in the first pressurizing chamber is higher than the predetermined value.

In the disabled mode of the first-fill device, the working fluid in the first pressurizing chamber is inhibited from being discharged to the working fluid source. So the working fluid in the first pressurizing chamber is supplied to the brake cylinder, that is, the brake cylinder is supplied with the working fluid from the first and second pressurizing chamber. Therefore, in this mode, if an increasing rate of the fluid pressure in the brake cylinder is held constant, a stroke rate of the pressurizing piston can be smaller than in the mode wherein the working fluid is supplied to the brake cylinder only from the second pressurizing chamber.

(6) In a hydraulic braking system according to the above mode (5), the first-fill selecting device includes a shut-off valve disposed in series with the first-fill device and produces the enabled mode of the first-fill device by opening the shut-off valve and the disabled mode of the first-fill device by shutting the shut-off valve off.

In the hydraulic braking system according to the above mode (6), the shut-off valve is disposed in series with the first-fill device. The first-fill device is enabled in the open state of the shut-off valve, and disabled in the closed state.

(7) In a hydraulic braking system according to any one of the above mode (2)–(6), the working fluid source is a low pressure working fluid source storing the working fluid at approximately atmospheric pressure.

(8) In a hydraulic braking system according to any one of the above mode (2)–(7), the predetermined value coincides almost a value of a relief pressure.

If the first-fill device comprises a relief valve, a cost of the first-fill device can be reduced and an operation of the first-fill device can be easy to stabilize.

Furthermore, the first-fill device can also comprise a solenoid-operated pressure control valve. In this case, by controlling an electric current applied to the solenoid-operated pressure control valve, the valve is held closed while the fluid pressure in the first pressurizing chamber is lower than the predetermined value. If it becomes higher than that value, the valve is opened. The solenoid-operated pressure control valve can be a solenoid-operated shut-off valve, which is selectively opened or shut off by ON/OFF of the electric current, or can be also a linear-type-valve, which is opened at a pressure based on the electric current.

(9) In a hydraulic braking system according to any one of the above mode (2)–(8), the fluid pressure cylinder is a master cylinder including a pressurizing piston operatively connected to a brake operating member, the pressurizing piston being moved by the brake operating member to pressurize the working fluid in the first and second pressurizing chamber, and the hydraulic braking system further comprises (a) a brake pressure control device for controlling a fluid pressure in the brake cylinder in a mode wherein the brake cylinder is disconnected from the master cylinder; and (b) a brake system mode selecting device for selecting a mode between a master-pressure working mode wherein the brake is worked by the working fluid supplied to the brake cylinder from the master cylinder, and a control-pressure working mode wherein the brake is worked by the fluid pressure in the brake cylinder controlled by the brake pressure control device.

In the hydraulic braking system according to the above mode (9), a brake system mode is selected by the brake system state selecting device between a master-pressure working mode wherein the brake is worked by the working fluid supplied to the brake cylinder from the master cylinder, and a control-pressure working mode wherein the brake is worked by the fluid pressure in the brake cylinder controlled by the brake pressure control device.

The brake system mode selecting device can includes, for example, a master-cut valve disposed between the brake cylinder and the master cylinder. If the master-cut valve is opened, the working fluid in the master cylinder is supplied to the brake cylinder, and if the master-cut valve is closed, the brake is worked by the fluid pressure in the brake cylinder controlled by the brake pressure control device, without being supplied the working fluid from the master cylinder.

In general, a brake pressure control device includes a drive force source. It can be a device for controlling the fluid pressure in the brake cylinder not only by controlling the drive force source but also by making use of a fluid pressure in a drive pressure source that includes the drive force source. Whichever type it is, the fluid pressure in the brake cylinder can be higher than that in the master cylinder, as long as it includes the drive force source. As a device controlling by making use of the fluid pressure in the drive pressure source, for example, there is a device that includes more than one solenoid-operated pressure control valve or a fluid pressure control cylinder worked by the fluid pressure in the drive pressure source. The fluid pressure in the brake cylinder is controlled by controlling an electric current applied to the solenoid-operated pressure control valve or controlling a power supplied to the drive force source. If a brake pressure control device does not include a drive pressure source, the fluid pressure in the brake cylinder is controlled by controlling a power supplied to the drive force source.

(10) In a hydraulic braking system according to the above mode (9), by means of controlling the first-fill selecting device, the first-fill device is disabled in the control-pressure working mode and enabled in the master-pressure working mode selected by the brake system mode selecting device as a mode of the brake system.

If the brake cylinder is connected to the master cylinder, the first-fill device is enabled. At the beginning of a braking operation, the brake cylinder can be supplied with such much working fluid that a first-fill can be done rapidly. On the other hand, if the fluid pressure in the brake cylinder is controlled by the brake pressure control device, the first-fill device is disabled. In the enable state of the first-fill device, an increasing rate of the opposite force applied to the brake operating member changes in accordance with changing of the area pressurized between the state of being lower than the predetermined value and the state of being higher. Furthermore, the opposite force in a slow operation of the brake operating member differs from one in a quick operation. For example, if the first-fill device has a relief valve and an orifice which are disposed in parallel with each other, in the quick operation of the brake operating member is quick, that is, in a high advancing rate of the pressurizing piston, the first pressurizing chamber is pressurized. On the other hand, in the slow operation of the brake operating member, the fluid pressure in the first pressurizing chamber becomes almost same as the pressure in the working fluid source by means of the orifice. Therefore, the opposite force in the slow operation of the brake operating member differs from one in the quick operation. So in the control-pressure mode, the first-fill device is disabled so that, for example, an operation feeling of an operator can be better than in the enabled state.

(11) A hydraulic braking system according to the above mode (9) or (10) further includes (a) a stroke simulator for applying an opposite force to the pressurizing piston based on an operating force of the brake operating member, allowing the pressurizing piston to move in the master cylinder; and (b) a simulator control device for inhibiting the stroke simulator from working at least at a pressure less than a predetermined value in the master-pressure working mode selected by the brake system mode selecting device and permitting the stroke simulator to work in the control-pressure working mode.

In the master-pressure working mode, the working fluid in the master cylinder can be supplied to the brake cylinder effectively because the stroke simulator is inhibited from working. If the stroke simulator is inhibited from working at a pressure less than the predetermined value, the first-fill can be done rapidly. Therefore, it is preferable that the stroke simulator is inhibited from working even at a pressure more than the predetermined value. In the control-pressure working mode, the stroke simulator is permitted to work. Therefore, even if the brake cylinder is held disconnected from the master cylinder, the operator can get a similar feeling to the feeling at the time when the brake cylinder is connected to the master cylinder.

(12) A hydraulic braking system according to the above mode (9) or (11) further includes (a) a stroke simulator for applying an opposite force to the pressurizing piston based on an operating force of the brake operating member, allowing the pressurizing piston to move in the master cylinder; and (b) a simulator control device inhibiting the stroke simulator from working at least at a pressure less than a predetermined value in the enabled mode of the first-fill device selected by the first-fill selecting device and permitting the stroke simulator to work in the disabled mode of the first-fill device.

In the enabled mode of the first-fill device, the stroke simulator is inhibited from working at least at a pressure less than the predetermined value. Consequently, the first-fill can be done rapidly by the first-fill device. In the disabled mode of the first-fill device, the stroke simulator is permitted to work.

(13) In a hydraulic braking system according to the above mode (12), the simulator control device is disposed between the stroke simulator and the second pressurizing chamber and includes a simulator control valve for selectively connecting the stroke simulator to the master cylinder and disconnecting the stroke simulator from the master cylinder.

If the simulator control valve is opened, the stroke simulator is permitted to work and if closed, it is inhibited. If the simulator control valve is designed to be held closed at a pressure less than a predetermined value, the stroke simulator is permitted to work at a pressure more than the predetermined value.

(14) In a hydraulic braking system according to the above mode (12), the stroke simulator includes (a) a housing, (b) a simulator piston defining a first chamber and a second chamber in the housing, and (c) a spring means for biasing the simulator piston in the direction that causes a reduction in the volume of the first chamber, which is connected the master cylinder, and the simulator control device is disposed between the low pressure working fluid source and the second chamber, which is at the opposite side of the first chamber, and includes a simulator control valve for selectively connecting the low pressure working fluid source to the second chamber and disconnecting the low pressure working fluid source from the second chamber.

If the spring constant is designed to be a value corresponding to a value of a predetermined pressure, the stroke simulator is inhibited from working at a pressure less than the predetermined value.

(15) In a hydraulic braking system according to any one of the above mode (1)–(14), a fluid passage from the first pressurizing chamber and a fluid passage from the second pressurizing chamber join and the juncture is connected to the brake cylinder.

(16) In a hydraulic braking system according to any one of the above mode (1)–(14), the pressurizing piston includes (a) a fluid passage for connecting the first pressurizing chamber to the second pressurizing chamber, (b) a check valve disposed on the fluid passage, for permitting a flow of the working fluid from the first pressurizing chamber to the second pressurizing chamber and inhibiting the opposite flow.

(17) A hydraulic braking system includes: a fluid pressure cylinder having a housing and including a pressurizing piston with a large-radius portion and a small-radius portion which is fluid-tightly and slidably received in the housing and which cooperates with the housing to define a first pressurizing chamber and a second pressurizing chamber, a working fluid in the first and second pressurizing chamber being pressurized by an advance of the pressurizing piston; a brake including a brake cylinder which is connected to the fluid pressurizing cylinder and which is activated by the fluid pressurized in the fluid pressurizing cylinder; a working fluid source connected to the fluid pressure cylinder; a flow inhibiting device provided between the working fluid source and the first pressurizing chamber, for inhibiting a flow of the fluid from the first pressurizing chamber to the working fluid source if a fluid pressure in the first pressurizing chamber is lower than a predetermined value and permitting the flow of the fluid from the first pressurizing chamber to the working fluid source if the fluid pressure in the first pressurizing chamber is higher than the predetermined value; and a flow mode selecting device selecting a mode between an enabled mode of the flow inhibiting device and a disabled mode of the flow inhibiting device.

In the enabled mode of the flow control device, if the fluid pressure in the first pressurizing chamber is lower than the predetermined value, the flow of the working fluid into and from the working fluid source is inhibited and if higher, it is permitted. Thus, the mode of the flow from the first pressurizing chamber into the working fluid source is controlled.

On the other hand, in the disabled mode of the flow control device, the flow of the working fluid in the first pressurizing chamber to the working fluid source is under no control. No matter how high the predetermined value is designed to be, the flow into and from the working fluid source can be permitted or also inhibited.

The predetermined value may be also designed to be a value not related to the value at the time when the first-fill is done.

(18) A hydraulic braking system includes: a low pressure working fluid source storing a working fluid at approximately atmospheric pressure; a master cylinder having (1) a housing, (2) a pressurizing piston which is fluid-tightly and slidably received in the housing, which cooperates with the housing to define a front pressurizing chamber, and which operatively connected to a brake operating member, the pressurizing piston being moved by the brake operating member to pressurize the working fluid in the front pressurizing chamber, and (3) a supply control device which permits a flow of the working fluid from the front pressurizing chamber to the low pressure working fluid source in a state wherein the pressurizing piston is at a rearmost position and inhibits the flow in another state; a flow inhibiting device which is provided between the master cylinder and the low pressure working fluid source and which inhibits the flow of the working fluid from the front pressurizing chamber to the low pressure working fluid source even in the state wherein the supply control device should permit the flow, if a fluid pressure in the front pressurizing chamber is unusual relative to an operation of the brake operating member.

In the hydraulic braking system according to the above mode (18), in the state the pressurizing piston is at a rearmost position, the supply control device permits the flow of the working fluid from the front pressurizing chamber to the low pressure working fluid source. Therefore, if an operator releases the brake operating member from an operating position toward the non-operated position, the working fluid in the front pressurizing chamber can be returned to the low pressure working fluid source. However, the fluid pressure in the front pressurizing chamber is unusual relative to the operation of the brake operating member, the flow inhibiting device inhibits the flow of the working fluid from the front pressurizing chamber to the low pressure working fluid source. Even in the state wherein the supply control device should permit the flow, it is inhibited. Therefore, the fluid pressure in the front pressurizing chamber can be controlled in order not to decrease.

The fluid braking system usually has, not only a master cylinder, a low pressure working fluid source, and a flow inhibiting device as described above, but also a brake cylinder, a master-cut valve, which permits a flow of the fluid between the master cylinder and the brake cylinder in the open state and inhibits in the closed state, and a brake pressure control device, which controls the fluid pressure in the brake cylinder in the closed state of the master-cut valve. In this case, even if the fluid pressure in the front pressurizing chamber becomes an unusual pressure, for example, due to a malfunction that the master-cut valve happens to be held open, the brake pressure control device can continue controlling the fluid pressure in the brake cylinder by virtue of inhibition of the flow from the front pressurizing chamber into the low pressure working fluid source.

(19) A hydraulic braking system according to the above mode (18) further includes (a) a brake cylinder which is activated by the pressurized working fluid, (b) a master-cut valve which is disposed between the brake cylinder and the front pressurizing chamber and which permits a flow in its open position and inhibits in its closed position, and (c) a brake pressure control device which is provided between the master-cut valve and the brake cylinder and which controls a fluid pressure in the brake cylinder based on a braking operation in the closed state of the master-cut valve.

The brake pressure control device controls the fluid pressure in the brake cylinder in the closed state of the master-cut valve. It may be a device for controlling the fluid pressure in the brake cylinder by a fluid pressure in a drive pressure source. It may be also arranged that such a device includes more than one solenoid-operated pressure control valve or a fluid pressure controll cylinder. The fluid pressure in the brake cylinder can be controlled by controlling the solenoid-operated pressure control valve or controlling a power supplied to a drive force source in the drive pressure source.

(20) In a hydraulic braking system according to the above mode (19), the flow inhibiting device includes a flow inhibiting valve which inhibits the flow of the working fluid from the front pressurizing chamber to the low pressure working fluid if the fluid pressure in the brake cylinder is actually lower than a value based on the fluid pressure in the front pressurizing chamber in the master cylinder although the fluid pressure in the brake cylinder should be controlled to be higher than that in the front pressurizing chamber by the brake pressure control device.

"If the fluid pressure in the brake cylinder is actually lower than a value based on the fluid pressure in the front pressurizing chamber in the master cylinder" is, in other wards, "if the fluid pressure in the front pressurizing chamber in the master cylinder is actually higher than a value based on the fluid pressure in the brake cylinder."

When the fluid pressure in the brake cylinder is controlled by the brake pressure control device to be lower than that in the front pressurizing chamber, the fluid pressure at the brake cylinder side of the master-cut valve should be higher than that at the master cylinder side. Therefore, if the fluid pressure in the brake cylinder is lower than a value based on the fluid pressure in the front pressurizing chamber in the master cylinder, the master-cut valve, which should be closed, is thought to be actually held in its open position, that is, in an opening-malfunction of the master-cut valve.

In the opening-malfunction of the master cylinder, a highly pressurized working fluid is supplied from the brake cylinder side of the master-cut valve to the master cylinder side of the master-cut valve. In this state, the fluid pressure in the front pressurizing chamber becomes high and the pressurizing piston has a possibility of being reversed to the rear end by the fluid pressure in the front pressurizing chamber. If the pressurizing piston is reversed to the rear end, the supply control device permits the flow of the working fluid from the front pressurizing chamber to the low pressure working fluid source, but in the braking system of the present invention as described above mode (20), the flow inhibiting valve inhibits the flow of the working fluid from the front pressurizing chamber. Therefore, the fluid pressure in the front pressurizing chamber can be controlled in order not to decrease.

Usually, the fluid pressure in the brake cylinder is controlled by the brake pressure control device based on the operation of the brake operating member. In addition, a fluid pressure is produced in the front pressurizing chamber of the master cylinder based on the operation of the brake operating member. Therefore, in the closed state of the master-cut valve, there should be some predetermined relationship between the fluid pressure in the brake cylinder and that in the master cylinder. On the other hand, in the state wherein the fluid pressure in the brake cylinder is lower than a value based on the predetermined relationship indicated above, for example, the fluid pressure in the brake cylinder is lower than the fluid pressure in the master cylinder multiplied by some predetermined value, the fluid pressure in the brake cylinder minus the fluid pressure in the master cylinder is lower than a predetermined value based on the fluid pressure in the brake cylinder or that in the master cylinder, or the fluid pressure in the brake cylinder minus the fluid pressure in the master cylinder is lower than a predetermined value in the case that the braking operation is more than predetermined, the master-cut valve can be thought to be in an opening-malfunction, that is, the fluid pressure in the front pressurizing chamber can be thought to be unusual.

It may be arranged that the flow inhibiting valve is a pilot-operated pressure control valve or a solenoid-operated pressure control valve, which is closed based on an applied electric current. If it is the solenoid-operated pressure control valve, for example, it is closed when the master-cut valve is decided to be in an opening-malfunction based on the master cylinder fluid pressure (the master cylinder side of master-cut valve) and the brake cylinder fluid pressure (the brake cylinder side of master-cut valve).

(21) In a hydraulic braking system according to the above mode (19) or (20), the flow inhibiting device includes a flow inhibiting valve which inhibits the flow of the working fluid from the front pressurizing chamber to the low pressure working fluid source if the fluid pressure in the front pressurizing chamber of the master cylinder is actually higher than a value based on a predetermined relationship with an operating force of the brake operating member although the fluid pressure in the brake cylinder should be controlled to be higher than that in the front pressurizing chamber.

The rear end where the pressurizing piston is reversed is usually regulated by a stopper etc. If the pressurizing piston is positioned at the rear end, the pressurizing piston receives the brake operating force and the opposite force of the stopper, and the fluid pressure corresponding to the sum of these force is produced in the front pressurizing chamber. On the other hand, unless the pressurizing piston is positioned at the rear end, the fluid pressure corresponding to the brake operating force is produced in the front pressurizing chamber, since there is no opposite force by the stopper. Therefore, if the operating force of the brake operating member is held constant, the fluid pressure in the front pressurizing chamber is higher when the pressurizing piston is positioned at the rear end than at a position other than the rear end. Making use of this fact, an opening-malfunction of the master-cut valve can be detected.

(22) A hydraulic braking system according to the above mode (18) further comprises (a) a brake cylinder which is activated by a pressurized working fluid, (b) a master-cut valve which is disposed between the brake cylinder and the front pressurizing chamber and which permits a flow between in its open position and inhibits in closed position, (c) a brake pressure control device which controls a fluid pressure in the brake cylinder in the closed state of the master-cut valve, and (d) a stroke simulator which applies the opposite force to the pressurizing piston based on the operating force of the brake operating member, allowing the brake operating member to move.

A brake pressure control device described as the above mode (22) may be not only a device which controls the fluid pressure in the brake cylinder based on the braking operation, but also a device which controls it not based on the braking operation.

The stroke simulator may be not only disposed between the front pressurizing chamber and the master-cut valve, but also connected directly to the front pressurizing chamber. Whichever type it is, even if the master-cut valve is in the closed state, an operator can get a similar feeling to the feeling in the opening state of the master-cut valve.

(23) In a hydraulic braking system according to the above mode (22), the flow inhibiting device includes a flow inhibiting valve which inhibits the flow of the working fluid from the front pressurizing chamber to the low pressure working fluid source if the fluid pressure in the front pressurizing chamber of the master cylinder is actually higher than a value based on an operating stroke of the brake operating member although the fluid pressure in the brake cylinder should be controlled to be higher than that in the front pressurizing chamber.

In the state wherein the master-cut valve is closed and the stroke simulator is connected to the front pressurizing chamber of the master cylinder, a fluid pressure corresponding to the operating stroke is produced in the front pressurizing chamber. On the other hand, if the master-cut valve is in the opening-malfunction, the fluid pressure in the front pressurizing chamber becomes higher than the value based on the operating stroke of the brake operating member. Therefore, the opening-malfunction of the master-cut valve can be detected based on a relationship between the operating stroke and the fluid pressure in the front pressurizing chamber. For example, a condition to detect is that the fluid pressure in the pressurizing chamber is higher than the fluid pressure based on the operating stroke multiplied by some predetermined value, or that the fluid pressure in the pressurizing chamber minus the fluid pressure based on the operating stroke is higher than a predetermined value based on the operating stroke.

(24) In a hydraulic braking system according to any one of the above mode (18)–(23), the flow inhibiting device includes a solenoid-operated pressure control valve which selects a mode, based on an applied electric current to a coil, between a flow inhibiting mode wherein the flow of the working fluid from the front pressurizing chamber to the low pressure working fluid source is inhibited and a flow permitting mode wherein it is permitted.

It is preferable that the solenoid-operated pressure control valve is a usually-open-valve, which is held open without an electric current. It means that in a normal braking operation, the working fluid in the front pressurizing chamber can be certainly returned to the low pressure working fluid source when the brake pedal is released from an operated position.

(25) In a hydraulic braking system according to the above mode (24), the flow inhibiting device includes (a) a master-cut valve malfunction detector which detects a malfunction of the master-cut valve in the mode wherein the fluid pressure in the brake cylinder is controlled by the brake pressure control device and (b) a valve controller which switches the solenoid-operated pressure control valve into the flow inhibiting mode, if the malfunction of the master-cut valve is detected by the master-cut valve malfunction detector.

A master-cut valve malfunction detector is a detector which detects that the master-cut valve is held open although it should be in the closed state, that is, it is an opening-malfunction. As described above, the malfunction of the master-cut valve can be detected based on the fluid pressure in the master cylinder and that in the brake cylinder, the pressure difference between at the front and rear of the master-cut valve, or the relation between the fluid pressure in the master cylinder and the operating state of the brake operating member, for example, the operating force or the operating stroke.

(26) A hydraulic braking system includes: a low pressure working fluid source storing a working fluid at approximately atmospheric pressure; a master cylinder having (1) a housing, (2) a pressurizing piston which is fluid-tightly and slidably received in the housing, which cooperates with the housing to define a front pressurizing chamber, and which operatively connected to a brake operating member, the pressurizing piston being moved by the brake operating member to pressurize the working fluid in the front pressurizing chamber, and (3) a supply control device which permits a flow of the working fluid from the front pressurizing chamber to the low pressure working fluid source in a state the pressurizing piston is at a rearmost position and inhibits the flow in another state; a pilot-operated pressure control valve which is provided between the master cylinder and the low pressure working fluid source, which has a movable member which is moved according to a fluid pressure in the front pressurizing chamber, and which inhibits the flow of the working fluid from the front pressurizing chamber to the low pressure working fluid source if the fluid pressure in the front pressurizing chamber is higher than a predetermined value.

In the state the pressurizing piston is positioned at the rearmost position, the supply control device permits the flow of the working fluid from the front pressurizing chamber to the low pressure working fluid source. However, if the flow of the working fluid from the front pressurizing chamber to the low pressure working fluid source is permitted and also the fluid pressure in the front pressurizing chamber is higher than the predetermined value, the pilot-operated pressure control valve is switched into the flow inhibiting state after the movable member is moved. Since the flow of the working fluid from the front pressurizing chamber to the low pressure working fluid source is inhibited, the fluid pressure in the front pressurizing chamber can be controlled in order not to decrease. Furthermore, as the flow inhibiting valve forms the pilot-operated pressure control valve, it can be switched into the flow inhibiting state even in case of an electric malfunction.

It may be also arranged that the pilot-operated pressure control valve has a movable member which is moved according to a relationship between the fluid pressure in the front pressurizing chamber and that in the brake cylinder, and inhibits the flow from the front pressurizing chamber to the low pressure working fluid source if the fluid pressure in the front pressurizing chamber becomes higher in that relation with the fluid pressure in the brake cylinder.

The technical features in the hydraulic braking system according to any one of the above mode (18)–(25) can be incorporated in the hydraulic braking system described as the above mode (26).

(27) In a hydraulic braking system according to any one of the above mode (18)–(26), the hydraulic braking system further comprises a stroke simulator which includes (a) a housing, (b) a simulator piston defining a first chamber connected to the front pressurizing chamber and a second chamber connected to the low pressure working fluid source in the housing, and (c) a spring means for biasing the simulator piston in the direction that causes a reduction of the volume of the first chamber; and a simulator control valve which is disposed between the low pressure working fluid source and the second chamber and which selectively connects the low pressure working fluid source to the second chamber and disconnects the low pressure working fluid source from the second chamber.

In the connecting state of the simulator control valve, the second chamber is connected to the low pressure working fluid source. Each volume in the first and second chamber can be changed, that is, the stroke simulator can be worked. In the disconnecting state of the simulator control valve, the second chamber is disconnected from the low pressure working fluid source, each volume in the first and second chamber can not be changed, that is, the stroke simulator can not be worked. It is preferable that the simulator control valve is held in its disconnecting position when the master-cut valve is in its connecting position, and the simulator control valve is held in its connecting position when the master-cut valve is in its disconnecting position. It may be arranged that the simulator control valve is switched between the connecting position and the disconnecting position based on a pilot pressure or an applied electric current. It may be also arranged that the simulator control valve is disposed between the first chamber and the front pressurizing chamber of the master cylinder.

(28) A hydraulic braking system according to the above mode (27) further comprises a simulator control valve controller which switches the simulator control valve into the disconnecting position in case of an opening-malfunction of the master-cut valve.

In case of the opening-malfunction of the master-cut valve, the stroke simulator does not need to be worked, because the front pressurizing chamber is connected to the brake cylinder. In this situation, if the simulator control valve is switched into disconnecting position and the stroke simulator is inhibited from working, ineffective consumption of the working fluid can be avoided.

It may be also arranged that the simulator control valve is switched into the disconnecting position when the flow inhibiting device is in the flow inhibiting mode or when the fluid pressure in the front pressurizing chamber is unusual.

(29) In a hydraulic braking system according to any one of the above mode (19)–(25), (27), or (28), the brake pressure control device includes (a) an operating force sensor which senses applied operating force to the brake operating member by an operator, and (b) an operating force-brake pressure controller which controls the fluid pressure in the brake cylinder based on the operating force of the brake operating member at least in the flow inhibiting mode wherein the flow inhibiting device inhibits the flow of the working fluid from the front pressurizing chamber to the low pressure working fluid source.

As indicated above, there is a difference in the relationship between the operating force of the brake operating member and the fluid pressure in the front pressurizing chamber in the master cylinder, between the inhibiting mode and the permitting mode of the flow inhibiting device. In the inhibiting mode of these modes, the opposite force by the stopper etc. needs to be considered. Therefore, in the braking system of the present invention as described above mode (29), the fluid pressure in the brake cylinder is controlled not based on the fluid pressure in the front pressurizing chamber but based on the operating force of the brake operating member at least in the inhibiting mode of the flow inhibiting device.

In the permitting mode of the flow inhibiting device, it is available based on whichever parameter.

The operating force-brake pressure controller can be thought to be a controller which controls the fluid pressure in the brake cylinder based on the operating force in the opening-malfunction of the master-cut valve.

(30) A hydraulic braking system includes: a low pressure working fluid source storing a working fluid at approximately atmospheric pressure; a master cylinder having (1) a housing, (2) a pressurizing piston which is fluid-tightly and slidably received in the housing, which cooperates with the housing to define a front pressurizing chamber, and which operatively connected to a brake operating member, the pressurizing piston being moved by the brake operating member to pressurize the working fluid in the front pressurizing chamber, and (3) a supply control device which permits a flow of the working fluid from the front pressurizing chamber to the low pressure working fluid source in the state the pressurizing piston is at a rearmost position and inhibits the flow in another state; a brake cylinder which is activated by a pressurized working fluid; a master-cut valve which is disposed between the brake cylinder and the front pressurizing chamber and which permits a flow in its open position and inhibits in its closed position; a brake pressure control device which is provided between the master-cut valve and the brake cylinder and which controls the fluid pressure in the brake cylinder in the closed state of the master-cut valve; and a flow inhibiting device which is provided between the master cylinder and the low pressure working fluid source and which inhibits the flow of the working fluid from the front pressurizing chamber to the low pressure working fluid source even in the state wherein the supply control device permits the flow, if the master-cut valve is in an opening-malfunction.

The technical features in the hydraulic braking system according to any one of the above mode (18)–(29) can be incorporated in the hydraulic braking system described as the above mode (30).

(31) A hydraulic braking system includes: a low pressure working fluid source storing a working fluid at approximately atmospheric pressure; a master cylinder having (1) a housing, (2) a pressurizing piston which is fluid-tightly and slidably received in the housing, which cooperates with the housing to define a front pressurizing chamber, and which operatively connected to a brake operating member, the pressurizing piston being moved by the brake operating member to pressurize the working fluid in a pressurizing chamber, and (3) a supply control device which permits a flow of the working fluid from the front pressurizing chamber to the low pressure working fluid source in the state the pressurizing piston is at a rearmost position and inhibits the flow in another state; a flow inhibiting device which is provided between the master cylinder and the low pressure working fluid source and which inhibits the flow of the working fluid from the front pressurizing chamber to the low pressure working fluid source even in the state wherein the supply control device permits the flow, if the fluid pressure in the front pressurizing chamber in the master cylinder to the operating state of the brake operating member is higher than value based on a predetermined relationship.

The technical features in the hydraulic braking system according to any one of the above mode (18)–(30) can be incorporated in the hydraulic braking system described as the above mode (31).

(32) A hydraulic braking system includes: a low pressure working fluid source storing a working fluid at approximately atmospheric pressure; a master cylinder having (1) a housing, (2) a pressurizing piston which is fluid-tightly and slidably received in the housing, which cooperates with the housing to define a front pressurizing chamber, and which operatively connected to a brake operating member, the pressurizing piston being moved by the brake operating member to pressurize the working fluid in the front pressurizing chamber, and (3) a supply control device which permits a flow of the working fluid from the front pressurizing chamber to the low pressure working fluid source in the state the pressurizing piston is at a rearmost position and inhibits the flow in another state; a brake cylinder which is activated by the pressurized working fluid; a master-cut valve which is disposed between the brake cylinder and the front pressurizing chamber and which permits a flow in its open position and inhibits in its closed position; a brake pressure control device which is provided between the master-cut valve and the brake cylinder and which controls the fluid pressure in the brake cylinder based on a braking operation in the closed state of the master-cut valve; a master-cut valve malfunction probability detector which detects probability of a malfunction of the master-cut valve; a flow inhibiting device which is provided between the master cylinder and the low pressure working fluid source and which inhibits the flow of the working fluid from the front pressurizing chamber to the low pressure working fluid source even in the state wherein the flow control device permits the flow, if the master-cut valve malfunction probability detector detects probability of the malfunction of the master-cut valve.

It is preferable that the flow inhibiting device has a solenoid-operated pressure control valve which selects a mode between its connecting mode and its disconnecting mode based on an applied electric current.

It may be arranged that the flow inhibiting device inhibits the flow of the working fluid when the master-cut valve malfunction probability detector detects probability, or when that probability is higher than a predetermined level.

The technical features in the hydraulic braking system according to any one of the above mode (18)–(31) can be incorporated in the hydraulic braking system described as the above mode (32).

(33) A hydraulic braking method includes fluid-tightly and slidably receiving a pressurizing piston in a housing of a fluid pressure cylinder, the pressurizing piston cooperating with the housing to define a front pressurizing chamber, pressurizing a working fluid in the front pressurizing chamber by an advance of the pressurizing piston, connecting a brake cylinder of a brake to the front pressurizing chamber, the brake cylinder activated by the working fluid pressurized in the front pressurizing chamber, connecting a working fluid source to the fluid pressure cylinder, and controlling a flow of the working fluid with a flow control device between the working fluid source and the fluid pressure cylinder based on a working state of the fluid pressure cylinder.

By controlling the flow of the working fluid between the working fluid source and the fluid pressurizing cylinder with the flow control device, more detail brake control is possible.

(34) A hydraulic braking method includes fluid-tightly and slidably receiving a pressurizing piston with a large-radius portion and a small-radius portion in a housing of a fluid pressure cylinder, the pressurizing piston cooperating with the housing to define a first pressurizing chamber and a second pressurizing chamber, pressurizing a working fluid in the first and second pressurizing chamber by an advance of the pressurizing piston, connecting a brake cylinder of a brake to the fluid pressurizing cylinder, the brake cylinder activated by the working fluid pressurized in the fluid pressurizing cylinder, connecting a working fluid source to the fluid pressure cylinder, providing a first-fill device between the working fluid source and the first pressurizing chamber, inhibiting a flow of the working fluid with the first-fill device from the first pressurizing chamber to the working fluid source if a fluid pressure in the first pressurizing chamber is lower than a predetermined value, permitting the flow of the working fluid with the first-fill device from the first pressurizing chamber to the working fluid source if the fluid pressure in the first pressurizing chamber is higher than the predetermined value, and selecting a mode with a first-fill selecting device between an enable mode of the first-fill device and a disabled mode of the first-fill device.

By selecting a mode between the enable mode and the disabled mode of the first-fill device, for example, a relationship between an operating of the brake operating member by an operator and a change of the fluid pressure in the brake cylinder can be tuned up.

(35) A hydraulic braking method includes storing a working fluid at approximately atmospheric pressure in a low pressure working fluid source, fluid-tightly and slidably receiving a pressurizing piston in a housing of a master cylinder, the pressurizing piston cooperating with the housing to define a front pressurizing chamber, the pressurizing piston connected operatively to a brake operating member, pressurizing the working fluid in the front pressurizing chamber by a movement of the pressurizing piston by the brake operating member, permitting a flow of the working fluid with a supply control device of the master cylinder from the front pressurizing chamber to the low pressure working fluid source in a state wherein the pressurizing piston is at a rearmost position and inhibiting the flow in another state, providing a flow inhibiting device between the master cylinder and the low pressure working fluid source, inhibiting the flow of the working fluid with the flow inhibiting device from the front pressurizing chamber to the low pressure working fluid source even in the state wherein the supply control device should permit the flow, if a fluid pressure in the front pressurizing chamber is unusual relative to an operation of the brake operating member.

In the hydraulic braking method according to the above mode (35), in the state the pressurizing piston is at the rear most position, by permitting the flow of the working fluid from the front pressurizing chamber to the low pressure working fluid source with the supply control device, if an operator releases the brake operating member from an operating position toward the non-operated position, the working fluid in the front pressurizing chamber can be returned to the low pressure working fluid source. However, if the fluid pressure in the front pressuring chamber is unusual relative to the operation of the brake operating member, by inhibiting the flow of the working fluid from the front pressuring chamber to the low pressure working fluid source with the flow inhibiting device even in the state wherein the supply control device should permit the flow, the fluid pressure in the front pressurizing chamber can be controlled in order not to decrease.

(36) A flow control device for controlling a flow of a working fluid in a hydraulic braking system includes a solenoid-operated pressure control valve which selects a mode, based on an applied electric current to a coil, between a flow inhibiting mode wherein the flow of the working fluid from a pressurizing chamber to a low pressure working fluid source is inhibited, and a flow permitting mode wherein the flow is permitted.

(37) In a flow control device according to the above mode (36), the flow control device is provided between a master cylinder of the hydraulic braking system and the low pressure working fluid source.

DETAILED DESCRIPTION OF PREFERRED EMBODIMENTS

Figure 1:
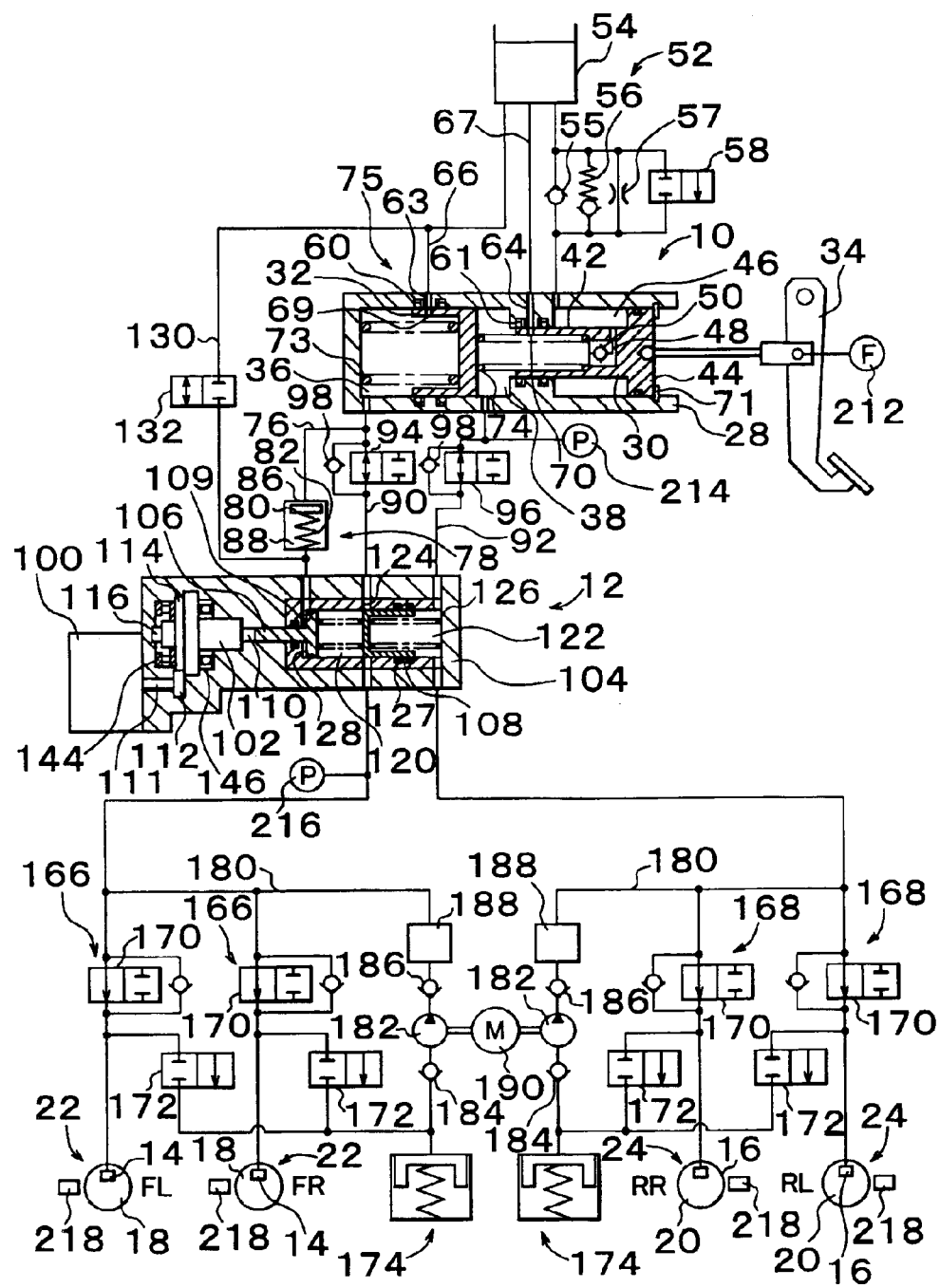
FIG. 1 is a schematic view of a hydraulic braking system constructed according to a first embodiment of this invention.

Referring first to FIG. 1, the hydraulic braking system shown therein is constructed according to one embodiment of this invention, for use on a four-wheel automotive vehicle having a left front wheel FL, a right front wheel FR, a left rear wheel RL and a right rear wheel RR. This braking system includes a brake operating member in the form of a brake pedal 34 connected to a fluid pressure cylinder in the form of a master cylinder 10. A brake pressure control device 12 is in the form of a fluid pressure control cylinder. Brake cylinders 14, 16 for respective brakes 22, 24 braking front wheels 18 and rear wheels 20. The brake cylinders 14,16 are connected to the master cylinder 10 through the fluid pressure control cylinder 12.

The master cylinder 10 has two pressurizing pistons 30, 32, both of which are fluid-tightly and slidably received in a housing 28 and the pressurizing piston 30 is connected to the brake pedal 34. The brake cylinders 14 for the front wheels 18 are connected to a pressurizing chamber 36 in front of the pressurizing piton 32 and the brake cylinders 16 for the rear wheels 20 are connected to a pressurizing chamber 38 in front of the pressurizing piton 30. The fluid pressure produced in these pressurizing chambers 36, 38 is the same. The pressurizing piston 30 has a large-radius portion 44 and a small-radius portion 42 and the small radius portion 42 faces the pressurizing chamber 38. A ring chamber 46 is defined by the housing 28 and the step which is formed by the large radius portion 44 and the small radius portion 42. The small-radius portion 42 has a connecting path 48 which connects the ring chamber 46 to the pressurizing chamber 38. A check valve 50 is disposed on the connecting path 48 which permits a flow of a working fluid from the ring chamber 46 to the pressurizing chamber 38 and inhibits the opposite flow. In this embodiment, a first pressurizing chamber in the claims is in the form of the ring chamber 46 and a second pressurizing chamber is in the form of the pressurizing chamber 38.

A working fluid source in the form of a reservoir 54 is connected to the ring chamber 46 through a flow inhibiting device 52. The reservoir 54 stores the working fluid at approximately atmospheric pressure. The flow control device 52 has a check valve 55, a relief valve 56 and an orifice 57 in parallel with each other. The check valve 55 permits a flow of the working fluid from the reservoir 54 to the ring chamber 46 and inhibits the opposite flow. The relief valve 56 permits the flow of the working fluid if a fluid pressure in the ring chamber 46 is greater than a predetermined value (i.e. relief pressure).

The fluid pressure in the ring chamber 46 and the pressurizing chamber 38 is increased in accordance with an advance of the pressurizing piston 30 (in a left direction as seen in FIG. 1). The fluid pressure in the ring chamber 46 is held increased until it reaches the relief pressure of the relief valve 56. While the fluid pressure in the ring chamber 46 is being greater than that in the pressurizing chamber 38, the working fluid in the ring chamber 46 is discharged to the pressurizing chamber 38 through the check valve 50 and thereafter, it is supplied to the brake cylinders 16. In this embodiment, the relief pressure is designed to be a pressure when a first-fill (fill-up of the brake cylinders) is almost done. While the first-fill is not being done, the working fluid is supplied from both the ring chamber 46 and the pressurizing chamber 38 to the brake cylinders 16. Therefore, the first-fill can be done rapidly.

If the fluid pressure in the ring chamber 46 reaches to the relief pressure, the working fluid is discharged to the reservoir 54 through the relief valve 56. In such state, the fluid pressure in the pressurizing chamber 38 is greater than that in the ring chamber 46, but the check valve 50 inhibits the flow of the working fluid from the pressurizing chamber 38 to the ring chamber 46. The brake cylinders 14, 16 are supplied with the working fluid from the pressurizing chambers 36. 38 not from the ring chamber 46. In view of this, the flow inhibiting device 52 can be thought to be a first-fill device. The first-fill device 52 includes at least the relief valve 56 and does not need to have the orifice 57 and the check valve 55.

After that, the fluid pressure in the pressurizing chamber 38 is increased in accordance with an advance of the pressurizing piston 30. In this state, since the pressurizing chamber 38 is pressurized by the small-radius portion 42, an increasing rate of the fluid pressure in the pressurizing chamber 38 is greater than pressurized by the large-radius portion 44 (i.e. both the ring chamber 46 and the pressurizing chamber 38 are pressurized) at a same increasing rate of an operating force of the brake pedal 34. In other words, a boosting ratio is greater. By the way, in a normal state of the pressurizing piston 30, the fluid pressure in the ring chamber 46 is approximately atmospheric pressure because the ring chamber 46 is connected to the reservoir 54 thorough the orifice 57. If the pressurizing piston 32 is reversed, the volume of the ring chamber 46 increases. However, it is avoided that the fluid pressure in the ring chamber 46 becomes negative pressure, because the working fluid is supplied from the reservoir 54 through the check valve 55 in accordance with the increase of the ring chamber 46's volume.

Provided that an effective pressure receiving surface area of the large radius-portion 44 is Am1, one of small radius portion 42 is Am3, and a stroke rate of the pressurizing piton 30, in a state wherein the brake cylinders 16 is connected to the master cylinder 10, is dL, the working fluid is supplied from the pressurizing chamber 38 at a flow rate q (=Am1*dL) before a first-fill is done. Once the first-fill is done, it is supplied at a flow rate q (Am3*dL). (Am1>Am3).

Provided that an increasing rate of the fluid pressure corresponding to an increasing rate of the operating force is dPF, the fluid pressure in the pressurizing chamber 38 is increased at an increasing rate dPM (dPF) before the first-fill is done. Once the first-fill is done, it is increased at an increasing rate dPM (=dPF*Am1/Am3).

In this way, before the first-fill is done, the working fluid can be supplied to the brake cylinders at a large amount rate in a state wherein a stroke rate is held constant. After the first-fill is done, the fluid pressure in the brake cylinders is increased at a large increasing rate in the state wherein an increasing rate of the operating force is held constant.

A solenoid-operated shut-off valve 58 is disposed in parallel with the first-fill device 52. In the closed state of this valve 58, the flow of the working fluid from the ring chamber 46 to the reservoir 54 is inhibited by the first-fill device 52. On the other hand, in the opening state of the solenoid-operated shut-off valve 58, the working fluid is supplied from the ring chamber 46 to the reservoir 54 mainly through the solenoid-operated shut-off-valve 58. That is, the flow of the working fluid is permitted even if the fluid pressure in the ring chamber 46 is lower than the predetermined value. In other words, the first-fill device 52 is enabled in the closed state of the solenoid-operated shut-off valve 58 and is disabled in the opening state of it. So a first-fill selecting device is in the form of the solenoid-operated shut-off valve 58. The solenoid-operated shut-off valve also can be said to be a kind of selecting valve.

Cup seals 60, 61 are provided at the respective pressurizing chambers 36, 38 in the housing 28. The ports 63, 64 are provided between the respective cup seals 60, 61, and are connected to the respective connecting paths 66, 67 from the reservoir 54. Each pressurizing piston 32, 30 has respective connecting paths 69, 70. These connecting paths 69, 70 are facing the respective port 63, 64, each pressurizing chamber 36, 38 is connected to the reservoir 54 and the flow of the working fluid from each pressurizing chamber 36, 38 to the reservoir 54 is permitted. It is a rear end where the flow of the working fluid from each pressurizing chamber 36, 38 to the reservoir 54 is permitted, that is, where the connecting paths 69, 70 are facing the respective ports 63, 64. The rear end of reversing of the pressurizing piston 30 is regulated by a stopper 71. Return springs 73, 74 are provided at the respective spaces, between the bottom of the housing 28 and the pressurizing piston 32, and between the pressurizing piston 30 and 32. The return springs 73, 74 also regulate the rear end of reversing of the pressurizing piston 32.

The fluid pressure control cylinder 12 is connected to the pressurizing chamber 36 through a connecting path 76. A stroke simulator 78 is disposed on the connecting path 76. The stroke simulator includes a simulator piston 80 defining a first chamber 86 and a second chamber 88 in the housing and a spring 82 biasing the simulator piston 80 in a direction that causes a reduction of the volume of the first chamber 86. The first chamber 86 is connected to the pressurizing chamber 36 and the second chamber 88 is connected to the fluid pressure control cylinder 12. The spring 82 is disposed in the second chamber 88.

The volume of the first chamber 86 is changed in accordance with the operation of the brake pedal 34, thereafter the spring 82 is elastically changes the shape of itself, and the opposite force corresponding to its biasing force is applied to the brake pedal 34.

The brake cylinders 14 of the front wheels 18 is connected to the pressurizing chamber 36 through the connecting path 90 and the brake cylinders 16 of the rear wheels 20 is connected to the pressurizing chamber 38 through the connecting path 92. In this embodiment, the braking system is a front and rear system type. On the connecting paths 90, 92, respective master-cut valves 94, 96, each of which is a solenoid-operated shut-off valve, are disposed. The brake cylinders 14, 16 are connected to the master cylinder 10 or disconnected from it by opening or closing of the respective master-cut valves 94, 96. Each of the master-cut valves 94, 96 is a usually-open-valve, which is held open without being applied an electric current to. Check valves 98 are disposed in parallel with the respective master-cut valves 94, 96. The check valves 98 permit the flow of the working fluid from the master cylinder side of the master-cut valves 94, 96 to the brake cylinder side of them and inhibit the opposite flow. The check valves 98 permit the flow of the working fluid from the master cylinder side to the brake cylinder side if the fluid pressure in the master cylinder gets greater in the closed state of the master-cut valves 94, 96.

In this embodiment, the master-cut valves 94, 96 are closed, if the fluid pressure in the brake cylinder can be controlled by the fluid pressure control cylinder 12, that is, a servo system including a drive force source (ex. a control motor) etc. is in a normal condition. The working fluid is supplied to the brake cylinders 14, 16 from the fluid pressure control cylinder 12. A mode wherein the brakes 22, 24 are worked by this controlled pressure is called the control-pressure working state. On the other hand, if the servo system is in an unusual condition, the master-cut valves 94, 96 are opened and the brakes 22, 24 are worked by the supply of the working fluid from the master cylinder 10 to the brake cylinders 14,16. This mode is called a master-pressure working state. In this embodiment, a brake system mode selecting device is in the form of the master-cut valves 94, 96.

The fluid pressure control cylinder 12 is provided at the lower side from the master-cut valves 94, 96 on the connecting paths 90, 92.

The fluid pressure control cylinder 12 is worked based on working of the drive force source in the form of an electric control motor 100. The control motor 100 can rotate forward and reverse. A rotary motion of the control motor 100 is converted a rectilinear motion by a motion converting device 102. The fluid pressure control cylinder 12 includes control pistons 106, 108, each of which is fluid-tightly and slidably received in a housing 104. It can be fluid-tight by providing an o-type ring 109 at the outer surface of the control piston 106. The control piston 106 is moved in accordance with a movement of a drive axis 110, which is an output axis of the motion converting device 102. The control piston 106 is advanced or reversed by working of the control motor 100. Further, a cup seal may be used as a substitute for the o-type ring. As described in FIG. 1, the rotary motion of the output axis 111 of the control motor 100 is transferred to a rotary axis 116 through a couple of gears 112, 114, and thereafter the rotary motion of the rotary axis 116 is converted the rectilinear motion by the motion converting device 102 and is output to the drive axis 110.

The brake cylinders 14, 16 of the front wheels 18 and the rear wheels 20 are connected to the respective control chambers 120, 122 in front of the respective control pistons 106, 108 (in a right direction as seen in FIG. 1). It can be said that the master cylinder 10 is connected to the brake cylinders 14, 16 through the respective control pressure chambers 120, 122.

The control pistons 106, 108 are disposed concentrically and in series with each other. Furthermore, return springs 124, 126 are provided at the respective spaces, between two control pistons 106, 108 and between the control piston 108 and the housing 104. In this way, the fluid pressure in two control chambers 120, 122 is held same. As the control piston 108 is moved based on the fluid pressures in the control chambers 120, 122, it can be called a floating piston or a differential piston. The fluid pressures in two control chambers 120, 122 are held same in a normal state. The brake cylinders 14, 16 of the front wheels 18 and rear wheels 20 are supplied with the working fluid at the same fluid pressure and each fluid pressure in the brake cylinders 14, 16 is increased or decreased syncronically by controlling of the control motor 100. The control piston 108 is fluid-tightly and slidably received in the housing 104 through a seal member 127. The seal member separates the control chamber 120 from the control chamber 122 and makes these two systems independent. In this way, even if one system malfunctions, the other system has less effect. Furthermore, the seal member 127 may be provided on whichever side, the housing 104 or the control piston 108.

The reservoir 54 is connected to a back chamber 128 at a back of the control piston 106 (in a left direction as seen in FIG. 1) through a reservoir path 130. A solenoid-operated shut-off valve 132 is disposed on the reservoir path 130. The solenoid-operated shut-off valve 132 is a usually-close-valve, which is held closed without a electric current. It is held closed in the connecting mode of the master-cut valves 94, 96 and open in the disconnecting mode of them. In the connecting mode of the solenoid-operated shut-off valve 132, the stroke simulator 78 is permitted to work, because the volume of the second chamber 88 of the stroke simulator 78 is allowed to change. On the other hand, in the disconnecting mode of the solenoid-operated shut-off valve 132, the stroke simulator 78 is inhibited from working, because the volume of the second chamber 88 of the stroke simulator 78 is inhibited from changing. The solenoid-operated shut-off valve 132 can be thought to be a selecting device which selects a mode between a mode wherein the stroke simulator 78 is permitted to work and a mode wherein it is inhibited from working.

The control piston 106 is advanced by rotation of the control motor 100 and the volume of the back chamber 128 is increased in accordance with an advance of the control piston 106. As described above, the working fluid is discharged from the second chamber 88 or the reservoir 54 to the back chamber 128. The fluid pressure in the back chamber 128 is atmospheric pressure.

The drive force based on the drive torque of the control motor 100 is applied to the control piston 106. Each fluid pressure in the control chambers 120, 122 is controlled to be a value corresponding to the drive force applied to the control piston 106. The drive force, that is, an electric current applied to the control motor 100 is controlled so that each fluid pressure in the control chambers 120, 122 comes up to a target brake pressure described later.

In this embodiment, the motion converting device 102 is an effective rotary-rectilineal converting device, which includes, for example, a ball screw. In FIG. 1 the motion converting device 102 has a thrust ball bearing 144 and a radial ball bearing 146. An axial force and a radial force are received by them.

Fluid pressure control valve devices 166, 168 are provided at the lower side from the fluid pressure control cylinder 12 on the respective connecting paths 90, 92. Each fluid pressure control valve device 166, 168 includes a holding valve 170 and a lowering valve 172. The holding valves 170 are disposed between the fluid pressure control cylinder 12 and the brake cylinders 14, 16. The lowering valves 172 are disposed between the brake cylinders 14, 16 and the reservoir 174. Each fluid pressure in the brake cylinders 14, 16 of the respective wheels 18, 20 can be controlled independently by control of these holding valves 170 and lowering valves 172. In this embodiment, an anti-lock brake control is executed by control of the fluid pressure control valve devices 166, 168, so that a slipping conditions of the respective wheels 18, 20 can be appropriate against the coefficient of friction on a road.

Pump paths 180 from the reservoir 174 are connected to the lower side from the fluid pressure control cylinder 12 at the upper side from the holding valves 170. Pumps 182, check valves 184, 186 and dampers 188 are disposed on the pump paths 180. The pumps 182 are worked by driving of a pump motor 190.

Figure 2:
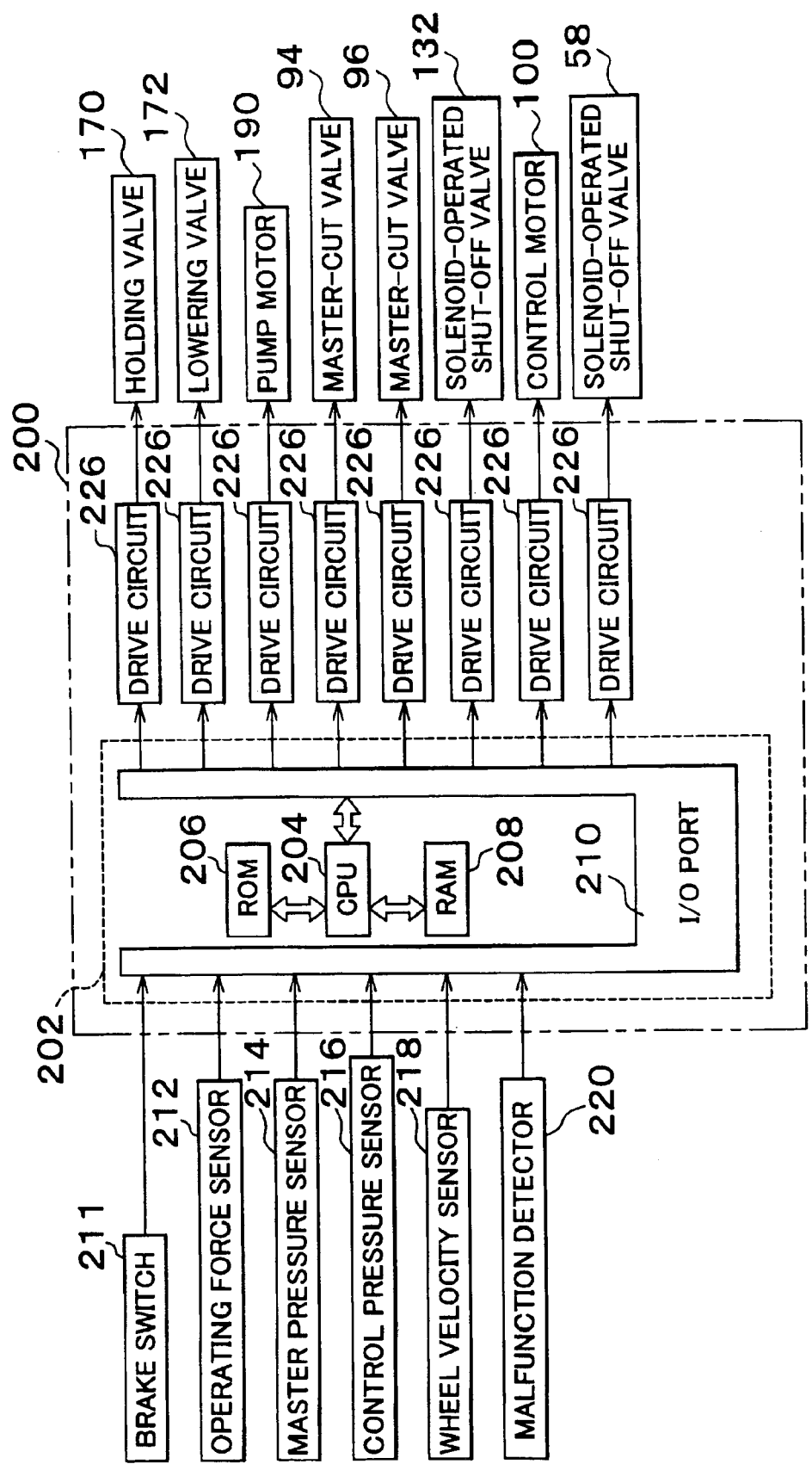
FIG. 2 is a block diagram illustrating an electrical arrangement of the first embodiment of this invention.

This braking system is controlled by a brake ECU (Electric Control Unit) 200 described in FIG. 2. The brake ECU includes a controller 202, which is mainly composed of computers, and some drive circuits. The controller 202 includes a CPU (Central Processing Unit) 204, a ROM (Read-Only Memory) 206, a RAM (Random-Access Memory) 208, an input-output portion 210 etc. Some electrical components are connected to the input-output portion 210, such as a brake switch 211 which detects whether the brake pedal 34 is operated or not, an operating force sensor 212 which senses the operating force applied to the brake pedal 34, a master pressure sensor 214 which senses the fluid pressure in the pressurizing chamber 38 of the master cylinder 10, a control pressure sensor 216 which senses the fluid pressure in the control chamber 120 of the fluid pressure control cylinder 12, a wheel velocity sensor 218 which senses a speed of revolution of the wheels 18, 20, a malfunction detector 220 etc. The master pressure sensor 214 is disposed on the connecting path 92 which is connected to the pressurizing chamber 38. The control pressure sensor 216 senses the fluid pressure in the control chambers 120, 122. However, while the fluid pressure control valve devices 166, 168 are positioned at their primary positions described in FIG. 1, it senses the fluid pressure in the brake cylinders 14,16. The malfunction detector 220 detects that the fluid pressure in the brake cylinder can not be controlled by the fluid pressure control cylinder 12 (i.e. a malfunction of the servo system). It detects a working malfunction of the control motor 100, a voltage drop of a power source which is connected to the control motor 100, a working malfunction of the fluid pressure control cylinder 12, and so on.

Furthermore, not only the coils of the holding valves 170, the lowering valves 172, the master-cut valves 94, 96, or the solenoid-operated shut-off valves 58, 132, but also the pump motor 190, the control motor 100 etc. are connected to the input-output portion 210.

Figure 3:
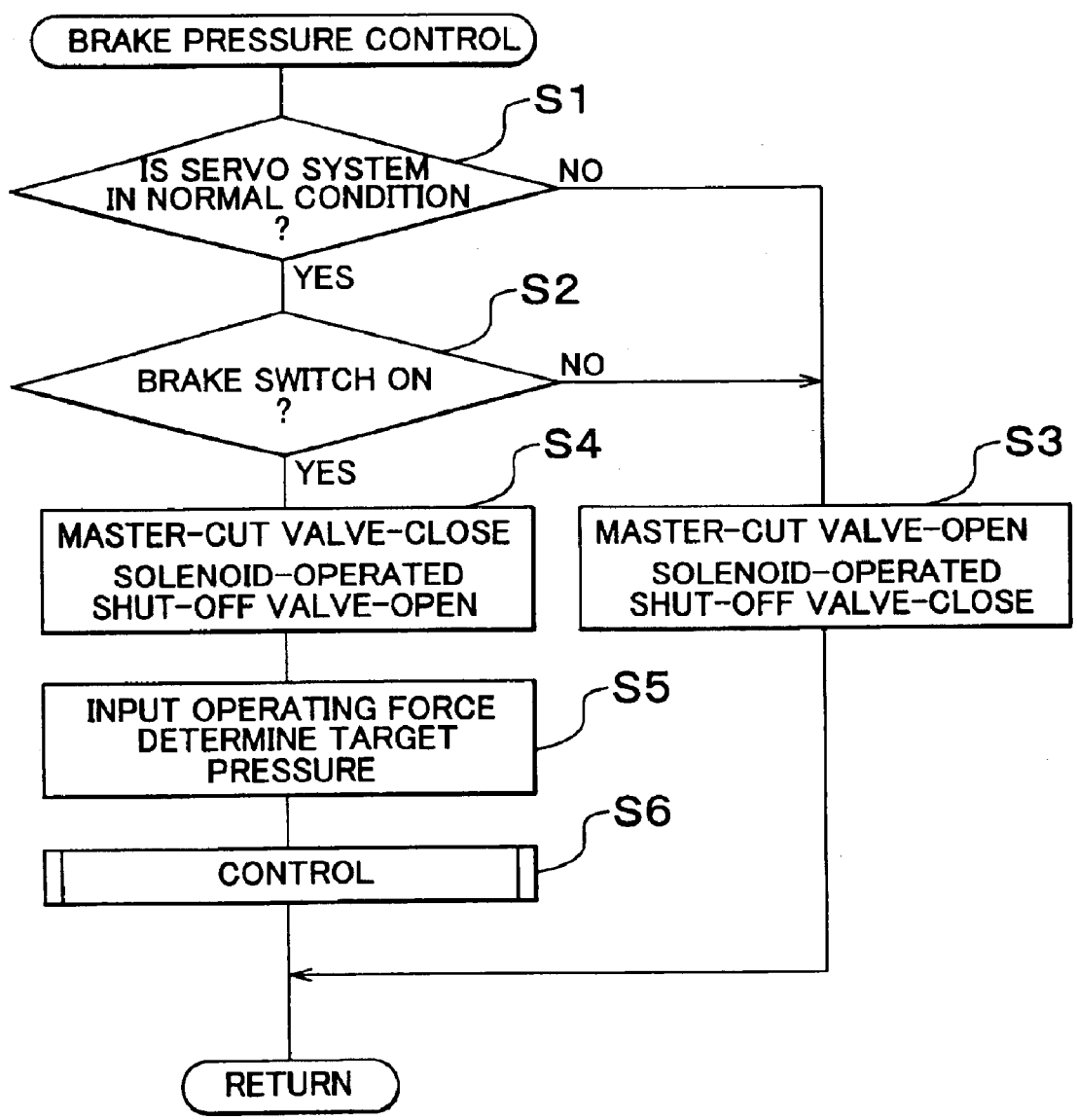
FIG. 3 is a flow chart illustrating an brake pressure control routine executed by an brake pressure control device.

The ROM 206 stores a brake pressure control program described in the flow chart of FIG. 3, other programs such as an anti-lock braking program of which flow chart is not described, a data table for determining a target brake pressure which is not described either, and so on.

There will next be described an operation of this brake system. In this embodiment, if the servo system is in a normal condition, that is, the fluid pressure in the control chambers 120, 122 can be controlled in the fluid pressure control cylinder 12, the brake cylinders 14, 16 are disconnected from the master cylinder 10 and the fluid pressure in the brake cylinders 14, 16, hereinafter referred to as the brake pressure, is controlled by the fluid pressure control cylinder 12 (control-pressure working mode). The master-cut valves 94, 96 are closed and the solenoid-operated shut-off valves 58, 132 are open. The first-fill device is disabled and the stroke simulator 78 is permitted to work.

On the other hand, if the servo system is in an unusual condition, that is, the fluid pressure in the control chambers 120, 122 can not be controlled in the fluid pressure control cylinder 12, the brake cylinders 14, 16 are connected to the master cylinder 10 and the respective brakes 22, 24 are worked by the working fluid in the master cylinder 10 (master-pressure working mode). In this case, any electric current is not applied to the coils of the master-cut valves 94, 96 and the solenoid-operated shut-off valves 58, 132. Therefore, the master-cut valves 94, 96 are open and the solenoid-operated shut-off valves 58, 132 are closed. The first-fill device is enabled and the stroke simulator 78 is inhibited from working.

In the enabled mode of the first-fill device 52, it is pressurized by the large-radius portion 44 of the pressurizing piston 30 before the first-fill is done, and it is pressurized by the small-radius portion 42 of the pressurizing piston 30 after the first-fill is done. Therefore, the opposite force applied to the brake pedal 34 changes as the line A in FIG. 4. There is a difference of increasing rates of the opposite force between before and after the first-fill is done; provided that an increasing rate of the fluid pressure in the pressurizing chambers 36, 38 is held constant. Further, the opposite force also depends on an operating speed of the brake pedal 34. If the operating speed is high, that is, an advancing rate of the pressurizing piston 30 is high, the ring chamber 46 is pressurized. If the advancing rate of the pressurizing piston 30 is low, the fluid pressure in the ring chamber 46 gets atmospheric pressure due to the orifice 57 which is connected to the reservoir 54.

Figure 4:
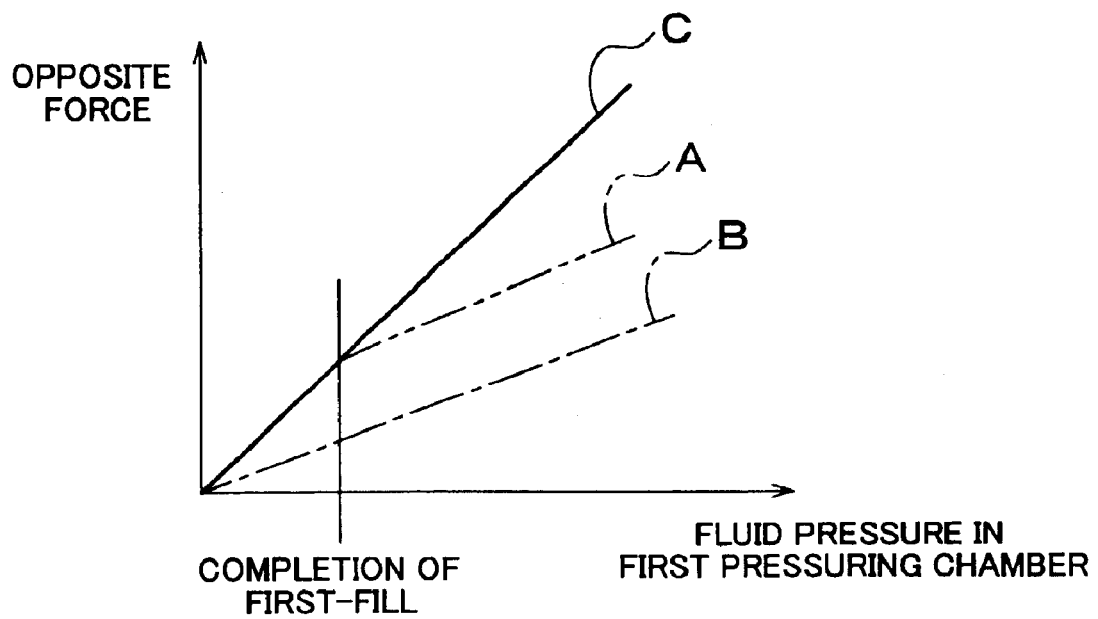
FIG. 4 is a graph indicating a relationship between the fluid pressure in the first pressurizing chamber and the opposite force.

On the other hand, in the disabled mode of the first-fill device 52, the opposite force changes as the line B in FIG. 4, because it is pressurized by the small-radius portion 44 of the pressurizing piston 30. The increasing rate of the opposite force can not change in this process, that is, it can not be affected by completion of the first-fill. Therefore, in this embodiment, the first-fill device 52 is disabled in the control-pressure working mode and enabled in the master-pressure working mode. The increasing rate of the opposite force can avoid changing through the process in the control-pressure working mode, while the first-fill can be done rapidly in the master-pressure working mode.

The fluid pressure cylinder 12 is controlled based on the operation of the brake pedal 34. A target value (ex. a target brake pressure, a target deceleration) is determined based on the operation of the brake pedal 34, and it is controlled so that a real value (ex. a real brake pressure, a real deceleration) comes up to the target value.

In this embodiment, the target brake pressure is determined based on operating force sensed by the operating force sensor 212, and the electric current applied to the control motor 100 is controlled so that the real brake pressure sensed by the control pressure sensor 216 comes up to the target brake pressure.

Referring to the flow chart of FIG. 3, it is determined whether the servo system is in a normal condition or not in step S1. That is to say, it is determined whether the control motor 100 etc. is in a normal condition or not. If it is in the normal condition, it is determined whether the brake pedal 34 is operated in step S2. If the brake pedal 34 is not operated, the control flow goes to step S3, where the master-cut valves 94, 96 and the solenoid-operated shut-offs valve 58, 132 are held at their primary positions as described in FIG. 1. The master-cut valves 94, 96 are held open, and the solenoid-operated shut-off valves 58, 132 are held closed.

If the servo system is in the normal condition and the brake pedal 34 is operated, the master-cut valves 94, 96 are closed and the solenoid-operated shut-offs valve 58, 132 are opened in step S4. In step S5, the target brake pressure is determined based on the operating force. In step S6, the electric current applied to the control motor 100 is controlled so that the real brake pressure comes up to the target brake pressure.

The opposite force applied to the brake pedal 34 changes as line B. It means that the increasing rate of the opposite force does not change through this process.

On the other hand, if the servo system is in the unusual condition, the master-cut valves 94, 96 and the solenoid-operated shut-off valves 58, 132 are repositioned at their primary positions as described in FIG. 1. In this state, the first-fill device 52 is enabled. Therefore, if the brake pedal 34 is operated, the first-fill can be done rapidly, because the working fluid is supplied from both ring chamber 46 and the pressurizing chamber 38 to the brake cylinders 14, 16 before the first-fill is done. After the first-fill is done, since it is pressurized by the small-radius portion 42, the increasing rate of the fluid pressure in the brake cylinder can be larger than by the large-radius portion 44, provided that the increasing rate of the operating force is held constant. Furthermore, the stroke simulator 78 is inhibited from working because the solenoid-operated shut-off valve 132 is closed. Therefore, the working fluid in the pressurizing chamber 36 can avoid being discharged to the stroke simulator 78 and consequently, can be supplied to the brake cylinders 14, 16 effectively.

As described above, in this embodiment, the first-fill selecting device is in the form of the part which stores and executes step S3 and S4 in the brake ECU etc., and the simulator control device is in the form of the part which stores and executes step S3 and S4 in the brake ECU, the solenoid-operated shut-off valve 132 etc.

Figure 5:
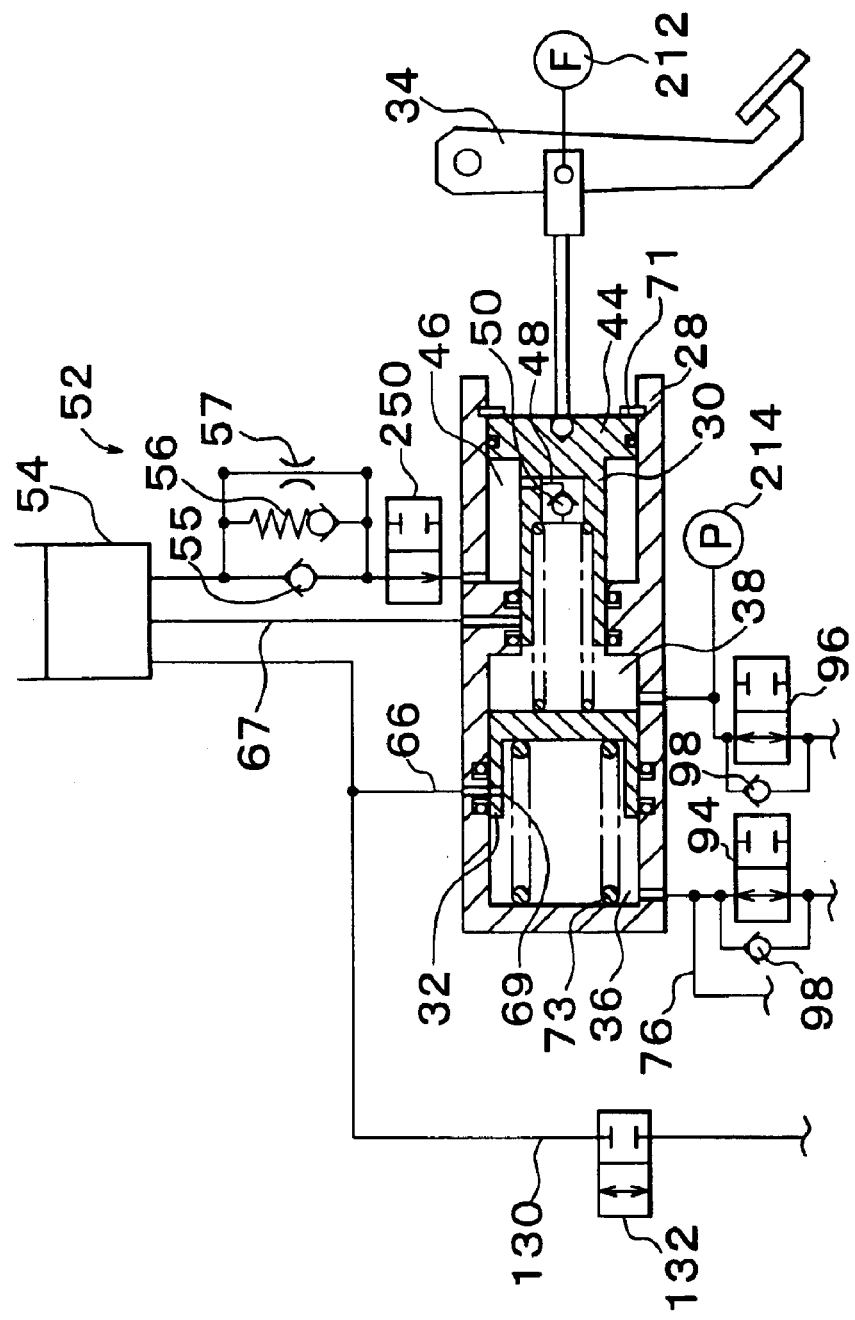
FIG. 5 is a schematic view of a hydraulic braking system constructed according to a second embodiment of this invention.

Although the first-fill selecting device is provided in parallel with the first-fill device 52 in above embodiment, it may be provided in series with the first-fill device 52. A brake system of a second embodiment described in FIG. 5 is arranged that a solenoid-operated shut-off valve 250 is provided in series with a first-fill device 52 between a ring chamber 46 and a reservoir 54. The first-fill device 52 is enabled in a connecting state of the solenoid-operated shut-off valve 250 and disabled in a disconnecting state of it. In the second embodiment, in a disabled mode of the first-fill device 52, a flow of a working fluid from the ring chamber 46 to the reservoir 54 is inhibited. The working fluid in the ring chamber 46 is discharged to a pressurizing chamber 38 through a check valve 50. Brakes 22, 24 are worked after the working fluid is supplied from both the pressurizing chamber 38 and the ring chamber 46 to brake cylinders 14, 16.

In the second embodiment, the first-fill device is disabled in a normal condition of the servo system and enabled in an unusual condition of it. An opposite force is changes as line C in FIG. 4, because it is pressurized by a large-radius portion in the disabled mode of the first-fill device 52. An operating stroke of a brake pedal 34 to an increase of a fluid pressure in the brake cylinders 14, 16 can be reduced.

Although the master-pressure working mode and the control-pressure working mode are selected based on normality of the servo system, it may be arranged that an operator can select with his own intention.

Further, both the solenoid-operated shut-off valve 58 and the solenoid-operated shut-off valve 250 may be provided. In this case, a first-fill device 52 is enabled in the state wherein the solenoid-operated shut-off valve 132 is closed and the solenoid-operated shut-off valve 132 is open. Either in the state wherein the solenoid-operated shut-off valves 58, 250 are open or in the state the solenoid-operated shut-off valve 250 is closed, the first-fill device is disabled. If the solenoid-operated shut-off valves 58, 250 are open, a working fluid in a ring chamber 46 is supplied to a reservoir 54 and it is pressurized by a small-radius portion 42. On the other hand, if the solenoid-operated shut-off valve 250 is closed, the flow of the working fluid from the ring chamber 46 to the reservoir 54 is inhibited and it is pressurized by a large-radius portion 44. In this way, if both the solenoid-operated shut-off valve 58 and the solenoid-operated shut-off valve 250 are provided, it is possible to select a mode between three modes: a enabled mode of the first-fill device 52, a mode wherein it is pressurized by the small-radius portion in a disabled mode, and a mode wherein it is pressurized by the large-radius portion in the disabled state. It may be arranged that an operator can select one of these modes with his own intention to get a brake feeling according to his intention.

Although in the first embodiment the relief pressure is designed to be the fluid pressure at the time when the first-fill is done, it may be a value greater than that pressure. In this case, in a normal condition of a servo system, master-cut valves 94, 96 may be closed and a solenoid-operated shut-off valve 58 may be open after a first-fill is done. In such embodiment, not only the first-fill can be done rapidly, but also it can be avoided that an operator's brake feeling gets worse in a control pressure working mode.

Furthermore, it may be arranged that the second pressurizing chamber is in the form of the ring chamber 46, and the first pressurizing chamber is in the form of the pressurizing chamber 38. That is, the pressurizing chamber 38 is connected to the reservoir 54 and the ring chamber 46 is connected to the brake cylinder.

It is not necessary that the second chamber 88 of the stroke simulator 78 is connected to the back chamber 128 of the fluid pressure control cylinder 12. It may be arranged that the second chamber 88 is connected only to the reservoir 54 not to the back chamber 128.

Further, it is not necessary that a brake pressure control device includes a fluid pressure control cylinder. Whichever structure is available, as long as it can control the fluid pressure in the brake cylinders 14, 16 at the lower side from the master-cut valves 94, 96 in the disconnecting mode of the master-cut valves 94, 96. For example, it may be arranged that the fluid pressure in the brake cylinders 14, 16 is controlled by the fluid pressure control valve devices 166, 168. In this case, a brake pressure control device is composed of the fluid pressure control valve devices 166, 168, the pump motor 190 as the drive force source, pumps 182 and so on. Furthermore, it may be arranged that it includes a pump and a fluid pressure control cylinder, a working fluid from the pump is supplied to the back chamber, and the control pistons is worked by the fluid pressure in the back chamber. In this case, the fluid pressure in the control chambers is controlled by controlling the fluid pressure in the back chamber. The fluid pressure in the back chamber can be controlled by controlling an electric current applied to a pump motor of the pump or controlling an electric current applied to a solenoid-operated control valve disposed between the pump and the back chamber.

Further, a brake pressure can be controlled based on a target deceleration. Furthermore, it may be arranged that the back chamber 128 is connected through a fluid path to the brake cylinder side from the fluid pressure control cylinder 12 of at least one of the connecting paths 90, 92, and a check valve is disposed on the fluid path, which permits a flow of a working fluid from the back chamber 128 to the fluid path and inhibits an opposite flow. By virtue of that check valve, a flow of the working fluid from the brake cylinder side to the back chamber side is inhibited and the working fluid in the back chamber 128 can be returned certainly to the fluid path side when the brake pedal is released from an operated position.

Figure 6:
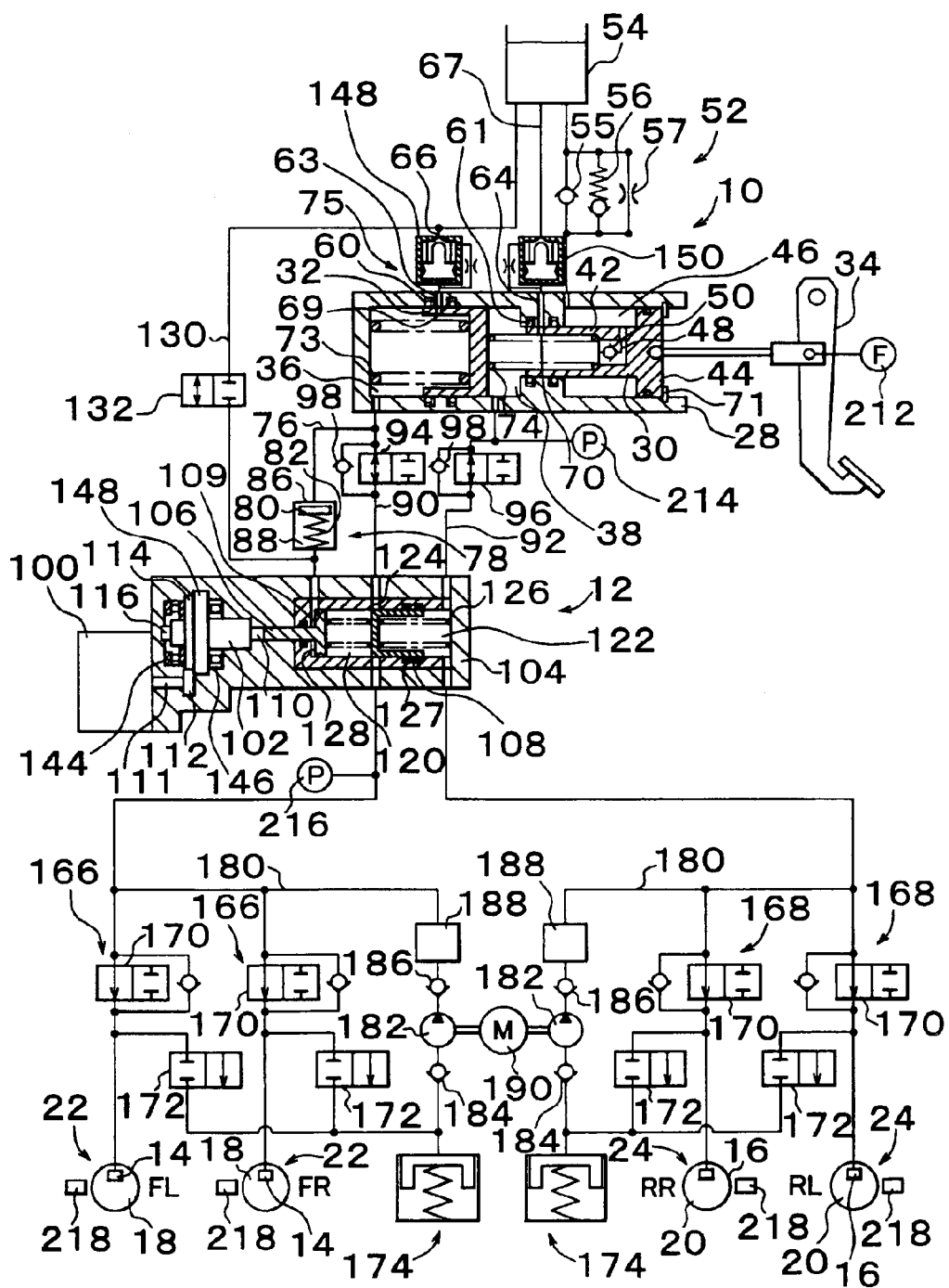
FIG. 6 is a schematic view of a hydraulic braking system constructed according to a third embodiment of this invention.

The third embodiment of this invention is described in FIG. 6. The same reference signs as used in the first or second embodiment will be used in the third embodiment to identify the same elements, which will not be described. The third embodiment is different from the first embodiment only in the flow control device of the brake system, as described below in detail.

In this embodiment, a supply control device 75 of a master cylinder 10 is composed of ports 63, 64, connecting paths 69, 70 and so on. A mode wherein these face each other is a supply permitting mode and the other mode is a supply inhibiting state.

In this embodiment, master-cut valves 94, 96 are closed when a first-fill is done, in a normal state of an electric system. A working fluid is supplied to the brake cylinders 14, 16 from the master cylinder 10 at the beginning of a brake operation, thereafter it is supplied from a fluid pressure control cylinder 12. In an unusual state of the electric system, the master-cut valves 94, 96 are open. Therefore, brakes 22, 24 are worked by supply of the working fluid from the master cylinder 10 to the brake cylinders 14, 16.

Figure 11:
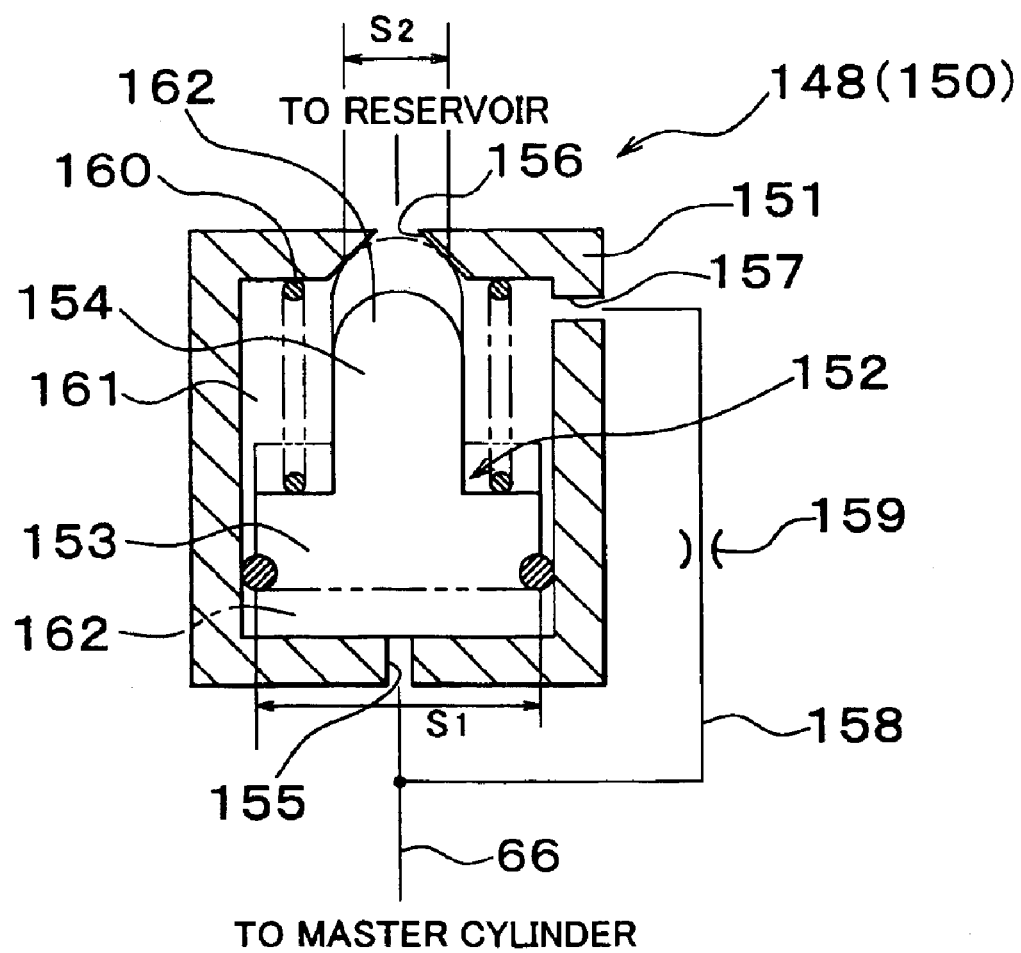
FIG. 11 is a cross sectional view of a flow inhibiting valve of the third embodiment of this invention.

Pilot-operated flow inhibiting valves 148, 150 described in FIG. 11 are disposed on one of connecting paths 66, 67 which connect the master cylinder 10 to a reservoir 54. The flow inhibiting valve 148 includes a housing 151 and a valve member 152, which is fluid-tightly and slidably received in the housing 151 and which is moved based on a fluid pressure in a pressurizing chamber 36 in a state wherein a pressurizing piston is positioned at a rear end. The valve member 152 has a step, having a large-radius portion 153 and a small-radius portion 154. A master cylinder side port 155 is provided at a valve member's large-radius portion side of the housing 151, and a reservoir side port 156 as a pedestal of the valve is provided at a valve member's small-radius portion side of the housing 151. A port 157 is also provided at an intermediate portion of the housing 151, which is connected to a connecting path 158 connected to the master cylinder side of the connecting path 66. An orifice 159 is provided on the connecting path 158. Further, a spring 160 is provided between the valve member 152 and the housing 151, which biases the valve member 152 in a direction that causes the valve member 152 to separate from the pedestal of the valve 156.

In the supply permitting mode of the supply control device 75, that is, the flow inhibiting valve 148 is positioned at its primary position as described in FIG. 6, it is in the connecting mode wherein the valve member 152 is separated from the pedestal of the valve 156. A ring space 161, which is defined by the step of the valve member 152 and the housing 151, is connected to the reservoir 54. That is, the pressurizing chamber 36 is connected to the reservoir 54. Therefore, the working fluid in the pressurizing chamber 36 flows to the reservoir 54 through the connecting path 66 (the connecting path 158), the ring space 161 and the reservoir side port 156.

If a fluid pressure of the working fluid supplied to the master cylinder side port 155 is greater than a predetermined value, the valve member is advanced and a tip portion 162 of the small-radius portion 154 contacts with the pedestal of the valve 156 to disconnect. As the orifice 159 is provided on the connecting path 158, if the working fluid supplied from the pressurizing chamber 36 is large, a fluid pressure difference between the ring space 161 and the master cylinder side port 155 is produced and the fluid pressure in the pressurizing chamber 36 is applied to the valve member 152.

When an effective pressure-receiving surface area of the large-radius portion 153 of the valve member 152 S1, a biasing force of the spring 160 f, and the fluid pressure of the working fluid supplied to the master cylinder side port 155 P satisfy a following formula:

$P > f/S1$, the flow inhibiting valve 148 is placed in its closed position.

In the disconnecting mode, as the working fluid in the pressurizing chamber 36 is also supplied to the ring space 161 through the connecting path 158, a fluid pressure in the space of the large-radius portion side 162 equals to that in the ring space 161. An effective pressure-receiving surface area of the valve member 152 by the fluid pressure in the ring space 161 is (S1−S2), and while a following formula:

$P*S1 > P*(S1-S2) + f$, that is, a formula:

$P > f/S2$ is satisfied, it is held in disconnected mode. The area S2 represents an area of a part which does not face to the ring space 161 due to the contact of the tip portion 162 to the pedestal of the valve 156, in other words, an area of a part inside from a part where the tip portion 162 of the valve 156 is contacted to the pedestal.

In this way, also in the supply permitting state of the supply control device 75, if the fluid pressure in the pressurizing chamber 36 is greater than the predetermined value, the flow inhibiting valve 148 is placed in its closed position to inhibit the flow of the working fluid from the pressurizing chamber 36 to the reservoir 54.

On the other hand, in the state each of the pressurizing pitons 30, 32 is returned to their rear end after the brake pedal is released, the flow inhibiting valve 148 is held connected when the working fluid is returned from the master cylinder 10 to the reservoir 54. The flow inhibiting valve 148 can not be closed by a fluid pressure P', which represents a fluid pressure applied when the brake pedal is released, that is, it is designed to satisfy a following formula:

$P' < f/S1$

In this embodiment, the biasing force of the spring 160 f and a structure of the flow inhibiting valve 148 are designed to satisfy the following formula:

$P*S2 > f > P'*S1$

A detail description of the valve 150 is left out because it has the same structure as the valve 148.

Figure 7:
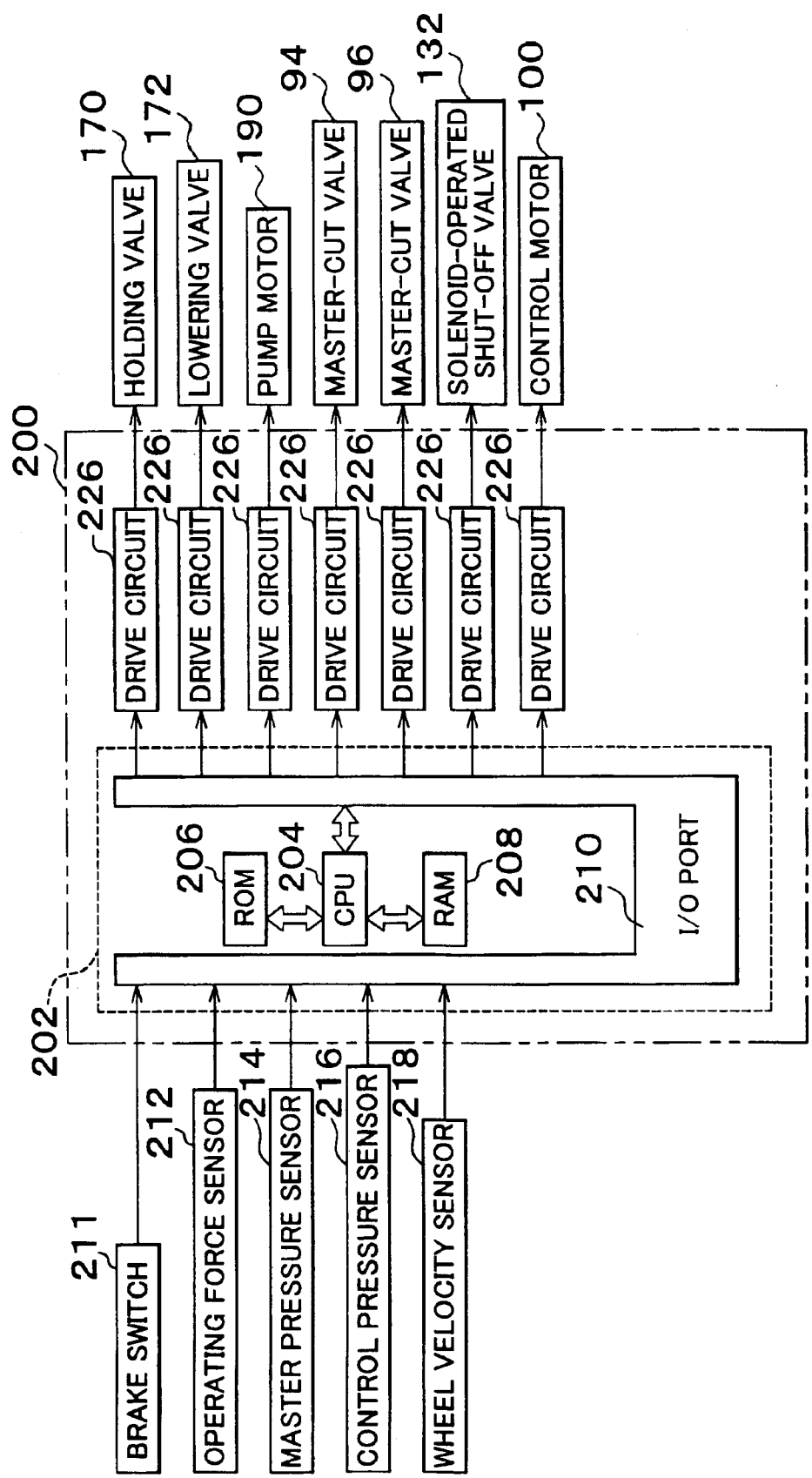
FIG. 7 is a block diagram illustrating an electrical arrangement of the third embodiment of this invention.

This braking system is controlled by a brake ECU 200 described in FIG. 7. Although the same reference signs as used in the first or second embodiment will be used in the third embodiment to identify the same elements, which will not be described, in this embodiment, a brake pressure control program in a ROM 206 is described in the flow chart of FIG. 8, a data table for determining a target brake pressure in the ROM 206 is described in FIG. 9, 10.

There will next be described an operation of this brake system. In a normal condition, any electric current is not applied to the solenoid-operated control valves and the valves are positioned at their primary positions as described in FIG. 6. If the brake pedal 34 is operated, the pressurizing pitons 30, 32 are advanced in accordance with the operation, and the working fluid is supplied to the brake cylinders 14, 18 to work the respective brakes 22, 24. When the fluid pressure in the brake cylinders reaches the pressure which indicates that the first-fill is done, the master-cut valves 94, 96 are closed. The fluid pressure in the brake cylinders 14, 16 is controlled by the fluid pressure control cylinder 12 in the state wherein the brake cylinders 14, 16 are disconnected from the master cylinder 10. In this situation, the solenoid-operated shut-off valve 132 is placed in its open position. As the volume of the second chamber 88 is allowed to change, the stroke simulator 78 is permitted to work While the working fluid in the pressurizing chamber 36 is supplied to the stroke simulator 78 in accordance with depression of the brake pedal 34, the opposite force is applied to the brake pedal 34 by that. If the volume of the first chamber 86 is increased, the volume of the second chamber 88 is decreased.

The fluid pressure cylinder 12 is controlled based on the operation of the brake pedal 34. A target value (ex. a target brake pressure, a target deceleration) is determined based on the operation of the brake pedal 34, and it is controlled so that a real value (ex. a real brake pressure, a real deceleration) comes up to the target value.

In this embodiment, the fluid pressure in the master cylinder is thought to be a value corresponding to the operating force of the brake pedal 34. The target brake pressure is determined based on the fluid pressure in the master cylinder sensed by the master pressure sensor 214, and the electric current applied to the control motor 100 is controlled so that the real brake pressure sensed by the control pressure sensor 216 comes up to the target brake pressure. On the other hand, if an opening-malfunction of the master-cut valves 94, 96 is detected, it is controlled based on the operating force sensed by the operating force sensor 212.

Figure 9:
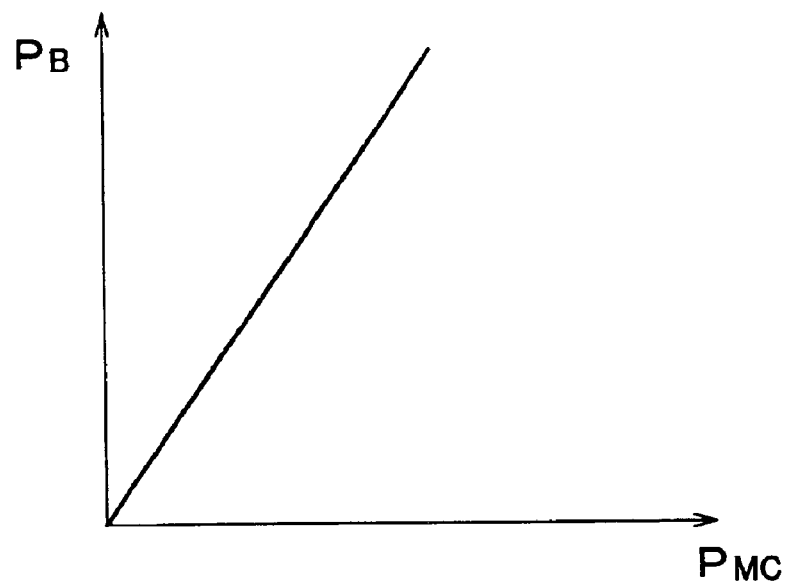
FIG. 9 is a graph indicating a data map for determining a target brake pressure stored in the brake pressure control device.

In this embodiment, in the disconnecting mode of the master-cut valves 94, 96, as described in FIG. 9, the target brake pressure PB is determined to be greater than the fluid pressure PMC in the pressurizing chambers 36, 38. The ratio of the target brake pressure PB to the fluid pressure in the master cylinder is designed to be greater than 1. So in the state wherein the master-cut valves 94, 96 are closed and the fluid pressure in the brake cylinders 14, 16 is controlled by the fluid pressure control cylinder 12, the fluid pressure at the brake cylinder side of the master-cut valves 94, 96 is greater than that at the master cylinder side.

Figure 10:
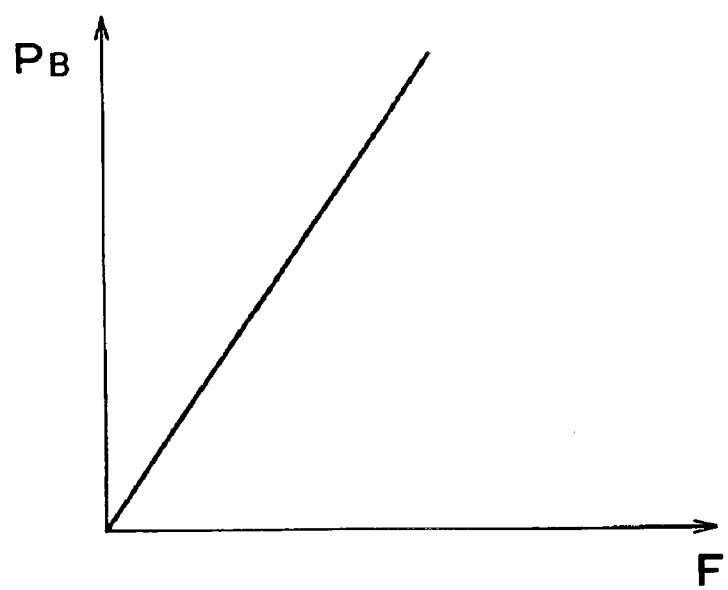
FIG. 10 is a graph indicating a data map for determining a target brake pressure stored in the brake pressure control device.

In the state the master-cut valves 94, 96 are malfunctioning, the target brake pressure is determined based on the operating force as described in FIG. 10.

If the master-cut valves 94, 96 are in the opening-malfunction, the fluid pressure in the fluid pressure control cylinder 12 is returned to the pressurizing chambers 36, 38 through the master-cut valves 94, 96. The fluid pressure in the pressurizing chambers 36, 38 becomes greater by this process. The pressurizing pitons 30, 32 is reversed to their rear end and the supply control device 75 permits the flow. The flow of the working fluid from the pressurizing chambers 36, 38 to the reservoir 54 is permitted. In this state, if the fluid pressure of the working fluid supplied to the master cylinder side ports 155 of the flow inhibiting valves 148, 150 becomes greater than the predetermined value, the flow inhibiting valves 148, 150 is placed in their closed position.

The operating force of the brake pedal is applied in the state wherein the pressurizing piston is positioned at the rear end, that is, the pressurizing piston 30 is contacted to the stopper 71. Therefore, both the operating force of the brake pedal and the opposite force of the stopper 71 is applied to the pressurizing piston 30 and the fluid pressure corresponding to the sum of these force is produced in the pressurizing chambers 36, 38. On the other hand, in the state the pressurizing piston is positioned at a position other than the rear end, as the opposite force of the stopper 71 can not be applied, the fluid pressure corresponding to the operating force is produced. For this reason, in the state the pressurizing piston is positioned at the rear end, the brake pressure is controlled based on the operating force sensed by the operating force sensor 212, not based on the fluid pressure in the master cylinder.

It can be detected based on the fluid pressure sensed by the master pressure sensor 214 and on the fluid pressure sensed by the control pressure sensor 216 whether the master-cut valves 94, 96 are not closed, that is, whether they are in the opening-malfunction. In this embodiment, when the fluid pressure sensed by the control pressure sensor 216 is lower than a value based on the fluid pressure sensed by the master pressure sensor 214 (ex. the sensed master pressure multiplied by some predetermined value), it is determined that the master-cut valves 94, 96 are in an opening-malfunction.

Figure 8:
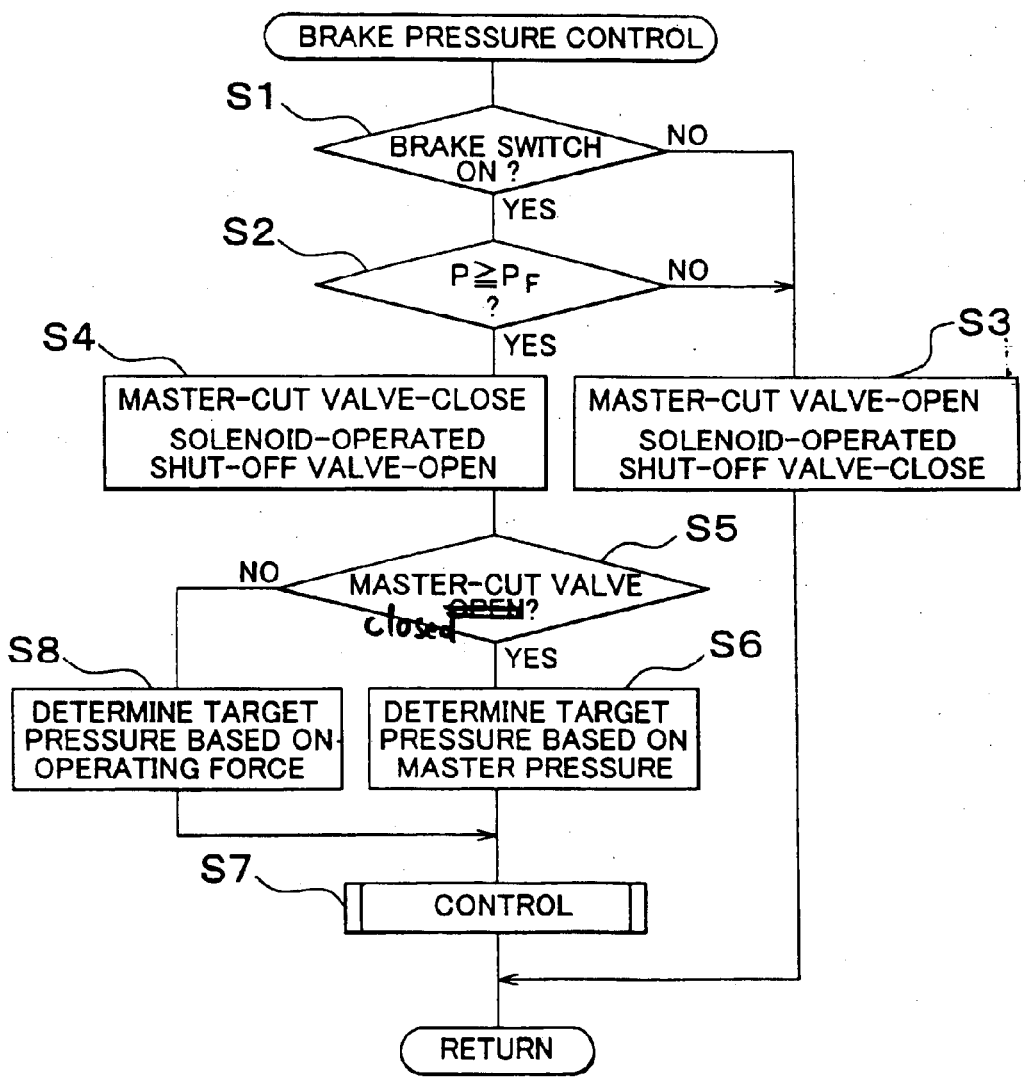
FIG. 8 is a flow chart illustrating a brake pressure control routine executed by a brake pressure control device of the third embodiment of this invention.

Referring to the flow chart of FIG. 8, it is determined whether the brake pedal 34 is operated or not in step S1. If it is operated, it is determined whether the fluid pressure sensed by the control pressure sensor 216 reaches the pressure which indicates that the first-fill is completed in step S2. If it is before the first-fill is completed, the master-cut valves 94, 96 and the solenoid-operated shut-off valve 132 are held at their primary position as described in FIG. 6 in step S3. The master-cut valves 94, 96 are held open, and the solenoid-operated shut-off valve 132 is held closed. As a large amount of the working fluid can be supplied to the brake cylinders 14, 16, the first-fill can be done rapidly. Furthermore, the stroke simulator 78 is inhibited from working because the solenoid-operated shut-off valve 132 is closed. Therefore, the working fluid in the pressurizing chamber 36 can avoid being supplied to the stroke simulator 78 and can be supplied to the brake cylinders 14, 16 effectively.

If the first-fill is done, the master-cut valves 94, 96 are placed in their closed position and the solenoid-operated shut-off valve 132 is placed in its open position in step S4. In step S5, the master pressure and the control pressure are sensed before it is determined whether the master-cut valves 94, 96 are in a normal state (i.e. in their closed position) or in an opening-malfunction. If the control pressure minus the master pressure is greater than the predetermined value, the master cut valve is considered to be closed and the target brake pressure is determined based on the master pressure in step S6. In step S7, the electric current applied to the control motor 100 is controlled so that the real brake pressure comes up to the target brake pressure.

If the master-cut valves 94, 96 are in the opening-malfunction, that is, they are held open although they should be closed, the operating force is sensed and the target brake pressure is determined based on the operating force in step S8.

On the other hand, if the brake switch 211 is OFF, in step S3 described above, the master-cut valves 94, 96 are returned to be at their primary positions as described in FIG. 6 and the solenoid-operated shut-off valve 132 is returned to be closed. It is preferable but not necessary that the solenoid-operated shut-off valve 132 is returned to be closed after it is held open for the time which is needed for the working fluid in the back chamber 128 to be returned certainly. Further, as the working fluid in the back chamber 128 is returned to the second chamber 88 of the stroke simulator 78, the working fluid in the first chamber 86 can be returned to the master cylinder 10 certainly.

In this way, in this embodiment, if the master-cut valves 94, 96 are in the opening-malfunction, control of brake pressure by the fluid pressure control cylinder 12 can be continued because the flow inhibiting valves 148, 150 are closed. Further, if the pressurizing piston 30 is positioned at the position other than the rear end, as the brake pressure is controlled based on the operating force, the brake pressure which an operator desires can be obtained more accurately than controlled based on the master pressure.

Figure 12:
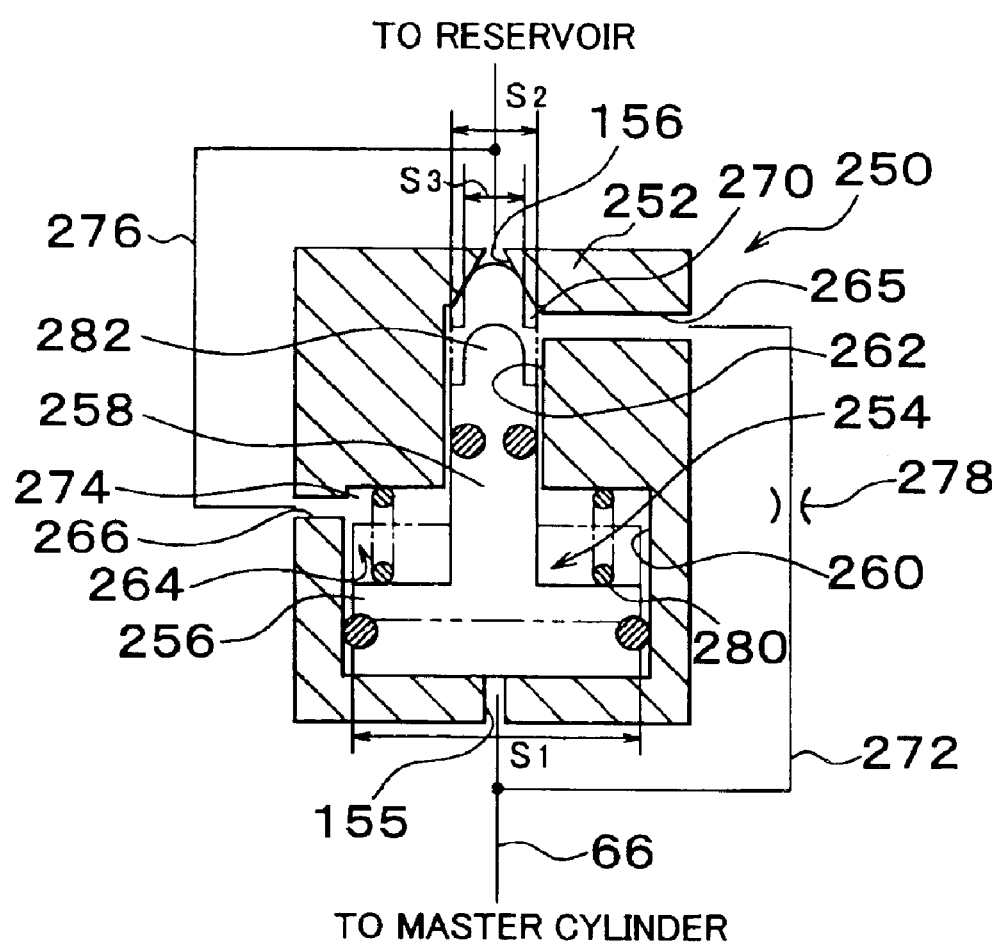
FIG. 12 is a cross sectional view of a flow inhibiting valve of a forth embodiment of this invention.

Furthermore, it may be arranged that a flow inhibiting valve has a structure as described in FIG. 12. Referring to FIG. 12, the flow inhibiting valve 250 includes a housing 252 and a valve member 254 which is fluid-tightly and slidably received in the housing 252 like the flow inhibiting valve 148. The valve member 254 has a step, having a large-radius portion 256 and a small-radius portion 258 like the flow-inhibiting valve 148. The housing 252 has a valve member receiving hole 264 which has a step with a large-radius portion 260 and a small-radius portion 262. The large-radius portion 256 of the valve member 254 is set in the large-radius portion 260 of the valve member receiving hole 264 and the small-radius portion 258 of the valve member 254 is set in the small radius portion 262 of the valve member receiving hole 264.

While a master cylinder side port 155 and a reservoir side port 156 as a pedestal of the valve is provided at the housing 252 like the flow inhibiting valve 148, port 265 and 266 are provided at respective portions, an intermediate portion of the small radius portion 262 of the valve member receiving hole 264 and an intermediate portion of the large radius portion 260 of the valve member receiving hole 264. A small-radius portion side ring chamber 270 is connected to a fluid path 272 which is connected to the master cylinder side of the connecting path 66 and a large-radius portion side ring chamber 274 is connected to a fluid path 276 which is connected to the reservoir side of the connecting path 66. An orifice 278 is provided on the fluid path 272. Further, a spring 280 is provided between the housing 252 of the large-radius portion side ring chamber 274 and the valve member 254, which biases the valve member 254 in a direction that causes the valve member 254 to separate from the pedestal of the valve 156.

At the primary position as described in FIG. 12, the valve member 254 is separated from the pedestal of the valve 156, so the flow inhibiting valve 250 is in its connecting mode. On the other hand, if the fluid pressure P of the working fluid supplied to the master cylinder side port 155 is greater than a predetermined value, the valve member 254 is advanced and a tip portion 282 of the small-radius portion 258 contacts with the pedestal of the valve 156 to disconnect. That disconnecting mode is held.

In this embodiment, a biasing force of the spring 160 f and a structure of the flow inhibiting valve 250 are designed to satisfy a following formula:

$$P*(S1-S2+S3) > f > P'*S1$$

In above formula, S1 represents an effective pressure-receiving surface area of the large-radius portion 256, S2 does an area of a cross section of the small-radius portion 258, and S3 does an area of a part inside from a part where the tip portion 282 is contacted to the pedestal of the valve 156.

Using the flow inhibiting valve 250 makes an area applied by the fluid pressure of the master cylinder in the disconnecting mode larger than using the flow inhibiting valve 148. Therefore, the spring 280 can be designed more widely (i.e. the spring constant can be chosen from wide range).

It is more possible that only one of the master-cut valves 94, 96 falls in the opening-malfunction than both of them do. Even in such a case, both of the flow inhibiting valves are closed because the both chamber 36 and 38 have the same fluid pressure. Therefore, the same control as described above can be done.

Figure 13:
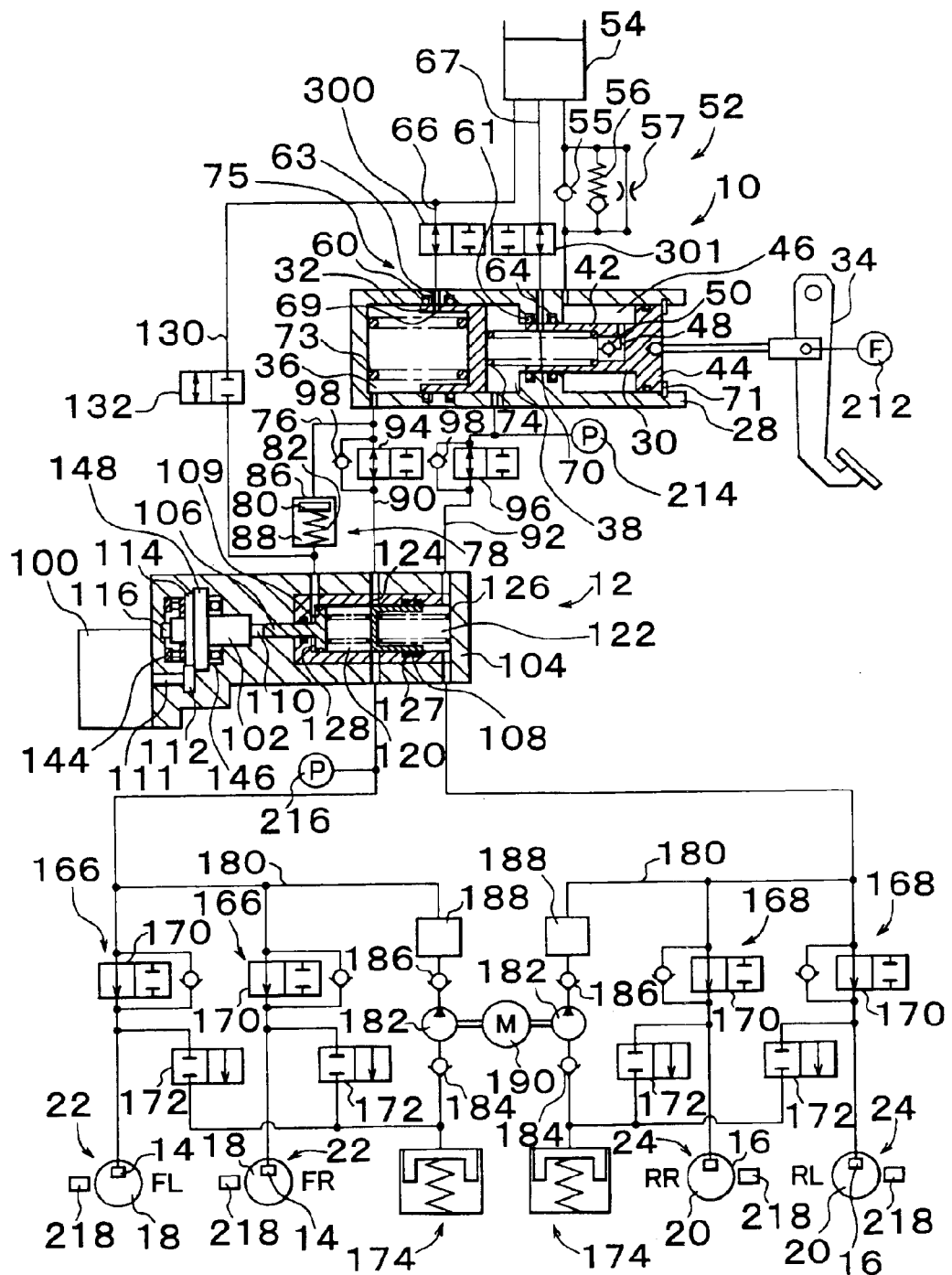
FIG. 13 is a schematic view of a hydraulic braking system constructed according to a fifth embodiment of this invention.

Further, a flow inhibiting valve may be designed to be a solenoid-operated shut-off valve. As described in FIG. 13, in the hydraulic braking system constructed according to the fifth embodiment, solenoid-operated shut-off valves 300, 301 as flow inhibiting valves are disposed on the respective connecting paths 66, 67. In this embodiment, if the brake pressure is lower than the master pressure multiplied by some predetermined value, the solenoid-operated shut-off valves 300, 301 are placed in their closed position. They are closed if the master-cut valves 94, 96 are detected to be open when they should be closed. It is not detected that the supply control device 75 is really in its supply permitting mode.

Figure 14:
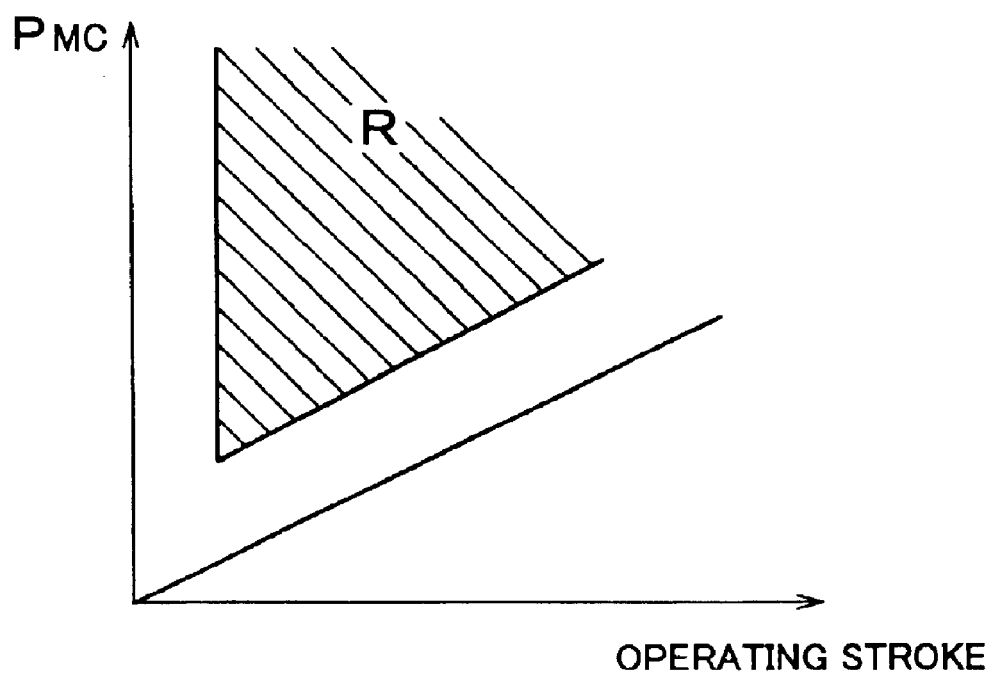
FIG. 14 is a graph indicating a relationship between an operating stroke and the fluid pressure in the master cylinder on detecting an opening-malfunction of the master-cut valve according to a sixth embodiment of this invention.

Furthermore, the opening-malfunction of the master-cut valves 94, 96 may be detected based on a relationship between the operating force of the brake pedal and the master pressure other than based on the relationship between the master pressure and the brake pressure. As indicated above, in the opening-malfunction, the master pressure is greater by a value corresponding to the opposite force of the stopper 71 than in a normal state, provided that the operating force of the brake pedal is held constant. Therefore, the opening-malfunction can be detected based on the relationship between the master pressure and the operating force. The opening-malfunction may be also detected based on a relationship between an operating stroke of the brake pedal 34 and the master pressure (the sixth embodiment). As described in FIG. 14, if both the operating stroke and the master pressure PMC are inside the region R of the graph, it can be defined to be in the opening-malfunction. In this embodiment, by virtue of the stroke simulator 78, the stroke of the brake pedal 34 is allowed to change and the appropriate opposite force is applied corresponding to the operating force, even if the master-cut valves 94, 96 are closed. An operator can get a similar feeling to a feeling at the time when the master-cut valves 94, 96 are open and also the opening-malfunction of the master-cut valves 94, 96 can be detected based on the relationship between the operating stroke and the master pressure.

Figure 15:
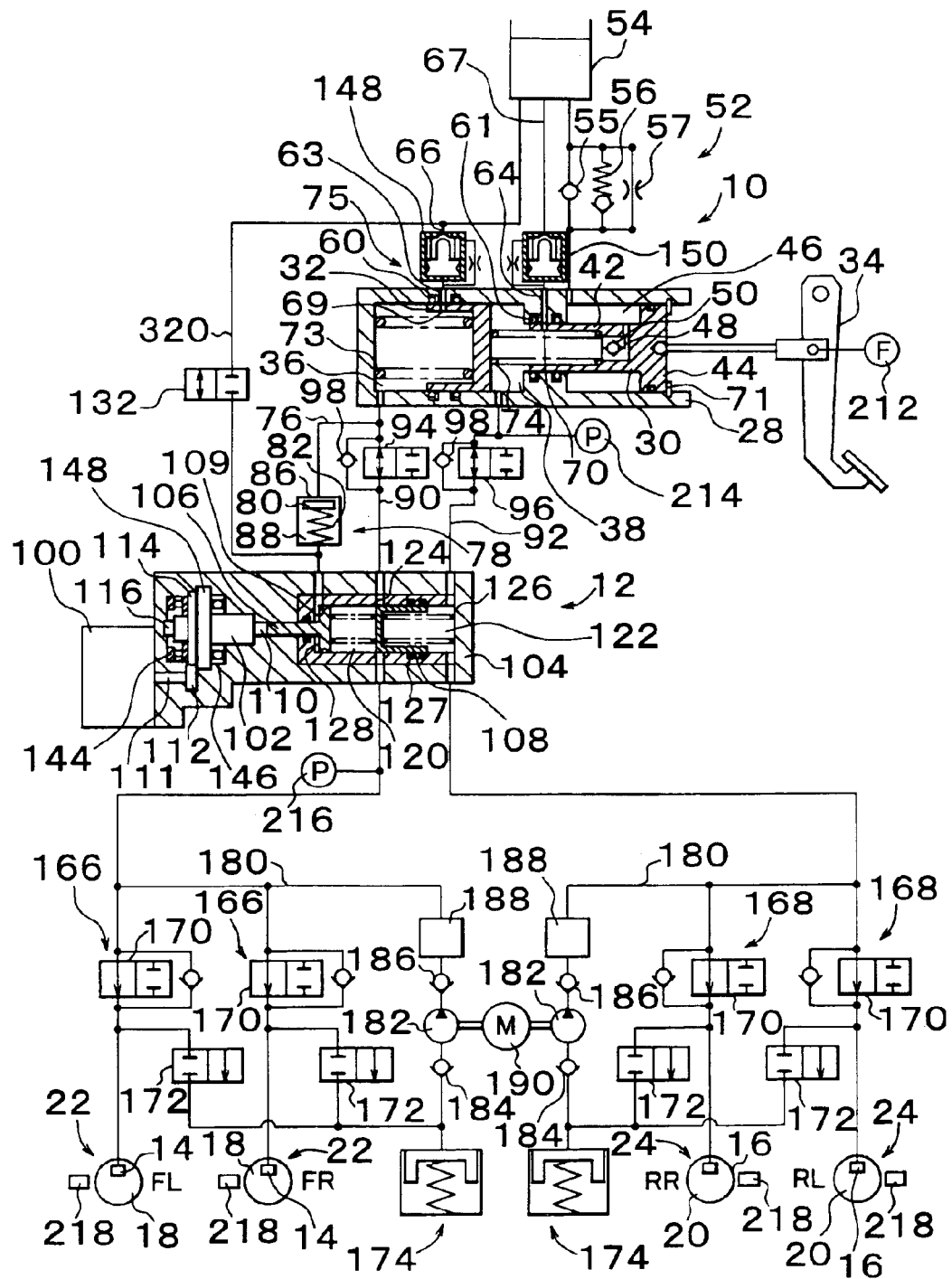
FIG. 15 a schematic view of a hydraulic braking system constructed according to a seventh embodiment of this invention.

Further, the solenoid-operated shut-off valve 132 may be also designed to be a linear-type-valve which is opened at a pressure based on an electric current not only a shut-off-type-valve. Furthermore, a structure of the braking system can not be limited to one described in the above embodiments. The back side of the control piston 106 may be connected to atmosphere. The brake system in such an embodiment (the seventh embodiment) is described in FIG. 15. In this embodiment, a second chamber 88 of a stroke simulator 78 is connected to a reservoir 54 through a connecting path 320 and a solenoid-operated shut-off 132 valve is disposed on the connecting path 320. While the solenoid-operated shut-off valve 132 is held open if master-cut valves 94, 96 are held closed, it is placed in its closed position once an opening-malfunction is detected. There is no need to work a stroke simulator 78 as long as the master-cut valves 94, 96 happen to be open. So a working fluid of pressurizing chambers 36, 38 is used for working of brakes 22, 24 effectively.

Furthermore, also a brake pressure control device is not limited to one described in the above embodiment. It may has any structure as long as it can control the fluid pressure in the brake cylinders 14, 16 at the lower side from the master-cut valves 94, 96 in the opening-malfunction of the master-cut valves 94, 96. For example, a control piston 106 may be moved by a fluid pressure in a back chamber 128 not by a control motor 100. The back chamber 128 is connected to a pump and a drive pressure source including a fluid pressure control valve device which can control a fluid pressure of a working fluid from the pump. The fluid pressure in the back chamber is controlled by the fluid pressure control valve device and a fluid pressure in control chambers 120, 122 in front of the control pistons 106, 108 is also controlled. Further, it is not necessary the brake system has the fluid pressure control cylinder 12. Drive pressure sources as described above may be connected at the respective lower sides from the respective master-cut valves 94, 96 of the respective connecting paths 90, 92. The drive pressure source may include an accumulator or more than two pumps. Furthermore, the fluid pressure in the brake cylinders 14, 16 may be controlled by the fluid pressure control valve devices 166, 168. In this case, a brake pressure control device is composed of the fluid pressure control valve devices 166, 168, the pumps 182 as drive force sources and so on.

Further, a brake pressure may be controlled based on a target deceleration. Furthermore, a brake pressure may be always controlled based on a sensed operating force without regard to an opening-malfunction of the master-cut valves 94, 96.

While the presently preferred embodiment of this invention has been described above by reference to the accompanying drawings, for illustrative purpose only, it is to be understood that the present invention may be embodied with various other changes, modifications and improvements, which may occur to those skilled in the art. The scope of the invention is set forth in the attached claims and their legal equivalents.

What is claimed is:

1. A hydraulic braking system comprising:

a fluid pressure cylinder having a housing and comprising a pressurizing piston with a large-radius portion and a small-radius portion which is fluid-tightly and slidably received in said housing and which cooperates with said housing to define a first pressurizing chamber and a second pressurizing chamber, a working fluid in said first and second pressurizing chamber being pressurized by an advance of said pressurizing piston;

a brake comprising a brake cylinder which is connected to said fluid pressurizing cylinder and which is activated by said working fluid pressurized in said fluid pressurizing cylinder;

a master cut valve provided between the brake cylinder and the front pressurizing chamber, which permits flow in its open position and inhibits flow in its closed position;

a brake pressure control device provided between said master cut valve and the brake cylinder and which controls a fluid pressure in the brake cylinder based on a braking operation in the closed state of the master cut valve;

a working fluid source connected to said fluid pressure cylinder;

a first-fill device provided between said working fluid source and said first pressurizing chamber, for inhibiting a flow of said working fluid from said first pressurizing chamber to said working fluid source if a fluid pressure in said first pressurizing chamber is lower than a predetermined value and permitting said flow of said working fluid from said first pressurizing chamber to said working fluid source if said fluid pressure in said first pressurizing chamber is hi her than said predetermined value; and a first-fill selecting device for selecting a mode between an enable mode of said first-fill device and a disabled mode of said first-fill device;

wherein said fluid pressure cylinder is a master cylinder is a master cylinder comprising a pressurizing piston operatively connected to a brake operating member, said pressurizing piston being moved by said brake operating member to pressurize said working fluid in said first and second pressurizing chamber, and said hydraulic braking system further comprises (a) a brake pressure control device for controlling a fluid pressure in said brake cylinder in a mode wherein said brake cylinder is disconnected from said master cylinder: and (b) a master cut valve for selecting a mode between a master-pressure working mode wherein said brake is worked by said working fluid supplied to said brake cylinder from said master cylinder, and a control-pressure working mode wherein said brake is worked by said fluid pressure in said brake cylinder controlled by said brake pressure control device; and (a) a stroke simulator for applying an opposite force to said pressurizing piston based on an operating force of said brake operating member, allowing said pressurizing piston to move in said master cylinder; and (b) a simulator control device for inhibiting said stroke simulator from working at least at a pressure less than a predetermined value in said master-pressure working mode selected by said brake system mode selecting device and permitting said stroke simulator to work in said control-pressure working mode.

2. A hydraulic braking system comprising:

a low pressure working fluid source storing a working fluid at approximately atmospheric pressure;

a master cylinder having (1) a housing, (2) a pressurizing piston which is fluid-tightly and slidably received in said housing, which cooperates with said housing to define a front pressurizing chamber connected to the brake cylinder, and which is operatively connected to a brake operating member, said pressurizing piston being moved by said brake operating member to pressurize said working fluid in said front pressurizing chamber, and (3) a supply control device which permits a flow of said working fluid from said front pressurizing chamber to said low pressure working fluid source in a state wherein said pressurizing piston is at a rearmost position end and inhibits said flow in another state;

a flow inhibiting device which is provided between said master cylinder and said low pressure working fluid source and which inhibits said flow of said working fluid from said front pressurizing chamber to said low pressure working fluid source even in said state wherein said supply control device should permit said flow, if a fluid pressure in said front pressurizing chamber is unusual relative to an operation of said brake operating member;

a brake cylinder which is activated by said pressurized working fluid;

a master-cut valve which is disposed between said brake cylinder and said front pressurizing chamber and which permits a flow in its open position and inhibits said flow in its closed position; and a brake pressure control device which is provided between said master-cut valve and said brake cylinder and which controls a fluid pressure in said brake cylinder based on a braking operation in said closed state of said master-cut valve;

wherein said flow inhibiting device comprises a flow inhibiting valve which inhibits said flow of said working fluid from said front pressurizing chamber to said low pressure working fluid source if said fluid pressure in said brake cylinder is actually lower than a value based on said fluid pressure in said front pressurizing chamber in said master cylinder.

3. A hydraulic braking system comprising:

a low pressure working fluid source storing a working fluid at approximately atmospheric pressure;

a master cylinder having (1) a housing, (2) a pressurizing piston which is fluid-tightly and slidably received in said housing, which cooperates with said housing to define a front pressurizing chamber connected to the brake cylinder, and which is operatively connected to a brake operating member, said pressurizing piston being moved by said brake operating member to pressurize said working fluid in said front pressurizing chamber, and (3) a supply control device which permits a flow of said working fluid from said front pressurizing chamber to said low pressure working fluid source in a state wherein said pressurizing piston is at a rearmost position end and inhibits said flow in another state;

a flow inhibiting device which is provided between said master cylinder and said low pressure working fluid source and which inhibits said flow of said working fluid from said front pressurizing chamber to said low pressure working fluid source even in said state wherein said supply control device should permit said flow, if a fluid pressure in said front pressurizing chamber is unusual relative to an operation of said brake operating member;

a brake cylinder which is activated by said pressurized working fluid;

a master-cut valve which is disposed between said brake cylinder and said front pressurizing chamber and which permits a flow in its open position and inhibits said flow in its closed position; and a brake pressure control device which is provided between said master-cut valve and said brake cylinder and which controls a fluid pressure in said brake cylinder based on a braking operation in said closed state of said master-cut valve;

wherein said flow inhibiting device comprises a flow inhibiting valve which inhibits said flow of said working fluid from said front pressurizing chamber to said low pressure working fluid source if said fluid pressure in said front pressurizing chamber of said master cylinder is actually higher than a value based on a predetermined relationship with an operating force of said brake operating member.

4. A hydraulic braking system comprising:

a low pressure working fluid source storing a working fluid at approximately atmospheric pressure;

a master cylinder having (1) a housing, (2) a pressurizing piston which is fluid-tightly and slidably received in said housing, which cooperates with said housing to define a front pressurizing chamber connected to the brake cylinder, and which is operatively connected to a brake operating member, said pressurizing piston being moved by said brake operating member to pressurize said working fluid in said front pressurizing chamber, and (3) a supply control device which permits a flow of said working fluid from said front pressurizing chamber to said low pressure working fluid source in a state wherein said pressurizing piston is at a rearmost position end and inhibits said flow in another state;

a flow inhibiting device which is provided between said master cylinder and said low pressure working fluid source and which inhibits said flow of said working fluid from said front pressurizing chamber to said low pressure working fluid source even in said state wherein said supply control device should permit said flow, if a fluid pressure in said front pressurizing chamber is unusual relative to an operation of said brake operating member;

a brake cylinder which is activated by said pressurized working fluid;

a master-cut valve which is disposed between said brake cylinder and said front pressurizing chamber and which permits a flow in its open position and inhibits said flow in its closed position; and a brake pressure control device which is provided between said master-cut valve and said brake cylinder and which controls a fluid pressure in said brake cylinder based on a braking operation in said closed state of said master-cut valve;

a stroke simulator which applies an opposite force to said pressurizing piston based on an operating force of said brake operating member, allowing said brake operating member to move, and said flow inhibiting device comprises a flow inhibiting valve which inhibits said flow of said working fluid from said front pressurizing chamber to said low pressure working fluid source if said fluid pressure in said front pressurizing chamber of said master cylinder is actually higher than a value based on an operating stroke of said brake operating member although said fluid pressure in said brake cylinder should be controlled to be higher than that in said front pressurizing chamber.

5. A hydraulic braking system comprising:

a low pressure working fluid source storing a working fluid at approximately atmospheric pressure;

a master cylinder having (1) a housing, (2) a pressurizing piston which is fluid-tightly and slidably received in said housing, which cooperates with said housing to define a front pressurizing chamber connected to the brake cylinder, and which is operatively connected to a brake operating member, said pressurizing piston being moved by said brake operating member to pressurize said working fluid in said front pressurizing chamber, and (3) a supply control device which permits a flow of said working fluid from said front pressurizing chamber to said low pressure working fluid source in a state wherein said pressurizing piston is at a rearmost position end and inhibits said flow in another state;

a flow inhibiting device which is provided between said master cylinder and said low pressure working fluid source and which inhibits said flow of said working fluid from said front pressurizing chamber to said low pressure working fluid source even in said state wherein said supply control device should permit said flow, if a fluid pressure in said front pressurizing chamber is unusual relative to an operation of said brake operating member;

a brake cylinder which is activated by said pressurized working fluid;

a master-cut valve which is disposed between said brake cylinder and said front pressurizing chamber and which permits a flow in its open position and inhibits said flow in its closed position; and a brake pressure control device which is provided between said master-cut valve and said brake cylinder and which controls a fluid pressure in said brake cylinder based on a braking operation in said closed state of said master-cut valve;

a stroke simulator which comprises (a) a housing, (b) a simulator piston defining a first chamber connected to said front pressurizing chamber and a second chamber connected to said low pressure working fluid source in said housing, and (c) a spring means for biasing said simulator piston in the direction that causes a reduction of the volume of said first chamber; and a simulator control valve which is disposed between said low pressure working fluid source and said second chamber and which selectively connects said low pressure working fluid source to said second chamber and disconnects said low pressure working fluid source from said second chamber.

6. A hydraulic braking system comprising:

a low pressure working fluid source storing a working fluid at approximately atmospheric pressure;

a master cylinder having (1) a housing, (2) a pressurizing piston which is fluid-tightly and slidably received in said housing, which cooperates with said housing to define a front pressurizing chamber connected to the brake cylinder, and which is operatively connected to a brake operating member, said pressurizing piston being moved by said brake operating member to pressurize said working fluid in said front pressurizing chamber, and (3) a Supply control device which permits a flow of said working fluid from said front pressurizing chamber to said low pressure working fluid source in a state wherein said pressurizing piston is at a rearmost position end and inhibits said flow in another state;

a flow inhibiting device which is provided between said master cylinder and said low pressure working fluid source and which inhibits said flow of said working fluid from said front pressurizing chamber to said low pressure working fluid source even in said state wherein said supply control device should permit said flow, if a fluid pressure in said front pressurizing chamber is unusual relative to an operation of said brake operating member;

a brake cylinder which is activated by said pressurized working fluid;

a master-cut valve which is disposed between said brake cylinder and said front pressurizing chamber and which permits a flow in its open position and inhibits said flow in its closed position; and a brake pressure control device which is provided between said master-cut valve and said brake cylinder and which controls a fluid pressure in said brake cylinder based on a braking operation in said closed state of said master-cut valve;

wherein said flow inhibiting device comprises a flow inhibiting valve which inhibits said flow of said working fluid from said front pressurizing chamber to said low pressure working fluid source if said fluid pressure in said brake cylinder is actually lower than a value based on said fluid pressure in said front pressurizing chamber in said master cylinder; and wherein said brake pressure control device comprises (a) an operating force sensor which senses applied operating force to said brake operating member by an operator, and (b) an operating force-brake pressure controller which controls said fluid pressure in said brake cylinder based on said operating force of said brake operating member at least in said flow inhibiting mode wherein said flow inhibiting device inhibits said flow of said working fluid from said front pressurizing chamber to said low pressure working fluid source.

7. A hydraulic braking system, comprising:

a low pressure working fluid source storing a working fluid at approximately atmospheric pressure;

a master cylinder having (1) a housing, (2) a pressurizing piston which is fluid-tightly and slidably received in said housing, which cooperates with said housing to define a front pressurizing chamber, and which operatively connected to a brake operating member, said pressurizing piston being moved by said brake operating member to pressurize said working fluid in said front pressurizing chamber, and (3) a supply control device which permits a flow of said working fluid from said front pressurizing chamber to said low pressure working fluid source in a state the pressurizing piston is at a rearmost position and inhibits said flow in another state;

a brake cylinder which is activated by said pressurized working fluid;

a master-cut valve which is disposed between said brake cylinder and said front pressurizing chamber and which permits a flow in its open position and inhibits said flow in its closed position;

a brake pressure control device which is provided between said master-cut valve and said brake cylinder and which controls said fluid pressure in said brake cylinder based on a braking operation in said closed state of said master-cut valve;

a master-cut valve malfunction probability detector which detects probability of a malfunction of said master-cut valve;

a flow inhibiting device which is provided between said master cylinder and said low pressure working fluid source and which inhibits said flow of said working fluid from said front pressurizing chamber to said low pressure working fluid source even in a state wherein said flow control device permits said flow, if said master-cut valve malfunction probability detector detects probability of said malfunction of said master-cut valve.

* * * * *

UNITED STATES PATENT AND TRADEMARK OFFICE
CERTIFICATE OF CORRECTION

PATENT NO. : 6,953,229 B2
DATED : October 11, 2005
INVENTOR(S) : Hiroshi Isono et al.

It is certified that error appears in the above-identified patent and that said Letters Patent is hereby corrected as shown below:

Column 33,
Line 10, after "system", insert a comma.
Line 43, "hi her" should read -- higher --.
Lines 48-49, delete "is a master cylinder" (second occurrence).
Line 57, "cylinder:" should read -- cylinder; --.

Column 34,
Lines 8 and 52, after "system", insert a comma.

Column 35,
Line 29, after "system", insert a comma.

Column 36,
Lines 12 and 62, after "system", insert a comma.

Column 37,
Line 6, "Supply" should read -- supply --.

Signed and Sealed this

Tenth Day of January, 2006

JON W. DUDAS
*Director of the United States Patent and Trademark Office*